(12) United States Patent
Shahana et al.

(10) Patent No.: US 12,151,762 B2
(45) Date of Patent: Nov. 26, 2024

(54) HUMAN-POWERED VEHICLE CONTROL DEVICE

(71) Applicant: Shimano Inc., Osaka (JP)

(72) Inventors: Satoshi Shahana, Osaka (JP); Nobukatsu Hara, Osaka (JP); Hitoshi Takayama, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/134,460

(22) Filed: Apr. 13, 2023

(65) Prior Publication Data

US 2023/0249776 A1    Aug. 10, 2023

Related U.S. Application Data

(62) Division of application No. 17/225,583, filed on Apr. 8, 2021, now Pat. No. 11,702,167, which is a division (Continued)

(30) Foreign Application Priority Data

Mar. 29, 2018 (JP) ................................. 2018-066077
May 25, 2018 (JP) ................................. 2018-100754

(51) Int. Cl.
*F16H 61/16* (2006.01)
*B62J 43/20* (2020.01)
(Continued)

(52) U.S. Cl.
CPC .............. *B62J 43/20* (2020.02); *B62J 43/30* (2020.02); *B62M 25/08* (2013.01); *F16H 61/16* (2013.01);
(Continued)

(58) Field of Classification Search
CPC .... F60H 61/16; F60H 59/66; F60H 2059/142; F60H 2059/666; F60H 2061/0223;
(Continued)

(56) References Cited

U.S. PATENT DOCUMENTS 5,356,348 A    10/1994   Bellio et al.
5,390,116 A *   2/1995   Hayafune ........... F16H 61/0213
                                                            180/197

(Continued)

FOREIGN PATENT DOCUMENTS

DE    198 03 812 A1    1/2001
JP    8-127382 A       5/1996
(Continued)

*Primary Examiner* — Roger L Pang
(74) *Attorney, Agent, or Firm* — Global IP Counselors, LLP

(57) ABSTRACT

A human-powered vehicle control device controls the transmission that changes the transmission ratio of a human-powered vehicle. The control device includes an electronic controller that switches between a first control state for controlling the transmission to change the transmission ratio in accordance with a first prescribed set of conditions, and a second control state for controlling the transmission to suppress the change of the transmission ratio as compared with if the electronic controller is in the first control state, in accordance with at least one of a steering state of the human-powered vehicle, a surface condition of a travel path on which the human-powered vehicle travels, and a pedaling preparation state related to the pedals of the human-powered vehicle.

10 Claims, 16 Drawing Sheets

Related U.S. Application Data of application No. 16/291,344, filed on Mar. 4, 2019, now Pat. No. 11,014,630.

(51) Int. Cl.
  *B62J 43/30*    (2020.01)
  *B62M 25/08*   (2006.01)
  *B62J 45/40*    (2020.01)
  *B62M 9/122*   (2010.01)
  *F16H 59/14*   (2006.01)
  *F16H 59/58*   (2006.01)
  *F16H 59/66*   (2006.01)
  *F16H 61/02*   (2006.01)

(52) U.S. Cl.
  CPC ............... *B62J 45/40* (2020.02); *B62M 9/122* (2013.01); *F16H 2059/142* (2013.01); *F16H 59/58* (2013.01); *F16H 59/66* (2013.01); *F16H 2059/663* (2013.01); *F16H 2059/666* (2013.01); *F16H 2061/0223* (2013.01); *F16H 2061/0227* (2013.01); *F16H 2061/163* (2013.01)

(58) Field of Classification Search
  CPC ...... F60H 2061/0227; F60H 2061/163; B62M 25/08; B62M 9/122; B60W 2552/40; B60W 2710/10; F16H 61/16; F16H 59/66; F16H 2059/142; F16H 2059/666; F16H 2061/0223; F16H 2061/0227; F16H 2061/163
  USPC ...................................................... 701/56, 62
  See application file for complete search history.

(56) References Cited

U.S. PATENT DOCUMENTS

| | | | | |
|---|---|---|---|---|
| 5,850,887 | A | * | 12/1998 | Nakashima .......... B60K 28/165 |
| | | | | 701/87 |
| 5,911,771 | A | * | 6/1999 | Reichart ................. F16H 59/60 |
| | | | | 701/65 |
| 9,234,580 | B1 | | 1/2016 | Usui et al. |
| 11,014,630 | B2 | | 5/2021 | Shahana et al. |
| 2002/0198078 | A1 | * | 12/2002 | Mori ................... F16H 61/0213 |
| | | | | 477/114 |
| 2009/0062069 | A1 | | 3/2009 | Nedachi et al. |
| 2015/0120119 | A1 | | 4/2015 | Tauchi et al. |
| 2016/0339990 | A1 | | 11/2016 | Walthert et al. |
| 2016/0375957 | A1 | | 12/2016 | Hashimoto et al. |
| 2016/0375958 | A1 | | 12/2016 | Hashimoto et al. |
| 2017/0073040 | A1 | | 3/2017 | Djakovic et al. |
| 2017/0297651 | A1 | | 10/2017 | Tsuchizawa et al. |
| 2018/0009503 | A1 | | 1/2018 | Kinpara |
| 2018/0023692 | A1 | | 1/2018 | Gauthier |
| 2018/0118305 | A1 | | 5/2018 | Tsuchizawa et al. |
| 2019/0202525 | A1 | | 7/2019 | Shahana et al. |
| 2019/0300103 | A1 | | 10/2019 | Shahana |
| 2019/0308690 | A1 | | 10/2019 | Terashima et al. |
| 2020/0102050 | A1 | * | 4/2020 | Shahana ................ B62M 9/122 |

FOREIGN PATENT DOCUMENTS

| | | |
|---|---|---|
| JP | 10-511621 A | 11/1998 |
| JP | 2001-280464 A | 10/2001 |
| JP | 2009-56961 A | 3/2009 |
| JP | 2015-110402 A | 6/2015 |
| JP | 2017-007644 A | 1/2017 |
| JP | 2018-1837 A | 1/2018 |
| JP | 2019-116241 A | 7/2019 |
| JP | 2019-137115 A | 8/2019 |

* cited by examiner

HUMAN-POWERED VEHICLE CONTROL DEVICE

CROSS-REFERENCE TO RELATED APPLICATIONS

This application is a divisional application of U.S. patent application Ser. No. 17/225,583, filed on Apr. 8, 2021, which in turn is a divisional application of U.S. patent application Ser. No. 16/291,344, filed on Mar. 3, 2019, now U.S. Pat. No. 11,014,630. This application claims priority to Japanese Patent Application Nos. 2018-066077, filed on Mar. 29, 2018, and 2018-100754, filed on May 25, 2018. The entire disclosures of U.S. patent application Ser. Nos. 16/291,344 and 17/225,583 are hereby incorporated herein by reference. The entire disclosures of Japanese Patent Application Nos. 2018-066077 and 2018-100754 are hereby incorporated herein by reference.

BACKGROUND

Technical Field

The present invention generally relates to a human-powered vehicle control device.

Background Information

In the human-powered vehicle control device according to Japanese Laid-Open Patent Publication No. 10-511621 (Patent Document 1), a transmission is controlled according to prescribed conditions in order to change a transmission ratio.

SUMMARY

The human-powered vehicle control device described above does not consider cases in which it is not preferable to change the transmission ratio. One object of the present invention is to provide a human-powered vehicle control device that is capable of suitably controlling the transmission.

A human-powered vehicle control device according to a first aspect of the present invention comprises an electronic controller that is configured to control a transmission that changes a transmission ratio of a human-powered vehicle. The electronic controller is configured to switch between a first control state that controls the transmission to change the transmission ratio in accordance with a first prescribed set of conditions, and a second control state that controls the transmission to suppress the change of the transmission ratio as compared to the first control state in accordance with at least one of a steering state of the human-powered vehicle, a surface condition of a travel path on which the human-powered vehicle travels, and a pedaling preparation state relating to a pedal of the human-powered vehicle.

The human-powered vehicle control device of the first aspect described above is configured to switch between the first control state and the second control state, which is suitable for at least one of the steering state of the human-powered vehicle, the surface condition of the travel path on which the human-powered vehicle travels, and the pedaling preparation state relating to the pedal of the human-powered vehicle. As a result, it is possible to suitably control the transmission.

In a second aspect of the human-powered vehicle control device according to the first aspect, the electronic controller is configured to switch between the first control state and the second control state in accordance with an output of a fifth detection unit, which detects a steering angle of a handle of the human-powered vehicle as information relating to the steering state.

The second aspect of the human-powered vehicle control device is configured to suitably detect the steering angle of the handle of the human-powered vehicle by means of the fifth detection unit.

In a third aspect of the human-powered vehicle control device according to the second aspect, the electronic controller is configured to switch to the second control state upon determining the steering angle is greater than a first steering angle while in the first control state.

The third aspect of the human-powered vehicle control device is configured to suppress the change of the transmission ratio upon determining the steering angle is greater than the first steering angle.

In a fourth aspect of the human-powered vehicle control device according to the second or third aspect, the electronic controller is configured to switch to the second control state upon determining the steering angle repeatedly increases and decreases within a third period of time while in the first control state.

The fourth aspect of the human-powered vehicle control device is configured to suppress the change of the transmission ratio upon determining the steering angle repeatedly increases and decreases within third period of time.

In a fifth aspect of the human-powered vehicle control device according to any one of the first to the fourth aspects, the electronic controller is configured to switch between the first control state and the second control state corresponding to the steering state in accordance with an output of a sixth detection unit, which detects a rider's gripping state of a handle of the human-powered vehicle.

The fifth aspect of the human-powered vehicle control device is configured to suitably detect the rider's gripping state of the handle of the human-powered vehicle, by means of the sixth detection unit.

In a sixth aspect of the human-powered vehicle control device according to the fifth aspect, the electronic controller is configured to switch to the second control state upon determining at least one hand of the rider is not gripping the handle while in the first control state.

The sixth aspect of the human-powered vehicle control device is configured to suppress the change of the transmission ratio upon determining at least one hand of the rider is not gripping the handle.

In a seventh aspect of the human-powered vehicle control device according to any one of the first to the sixth aspects, the electronic controller is configured to switch between the first control state and the second control state in accordance with an output of a seventh detection unit, which detects a friction coefficient of a surface of the travel path or a second parameter correlated with the friction coefficient as information relating to the surface condition of the travel path.

The seventh aspect of the human-powered vehicle control device is configured to suitably detect the friction coefficient of the surface of the travel path or the friction coefficient by means of the seventh detection unit.

In an eighth aspect of the human-powered vehicle control device according to the seventh aspect, the electronic controller is configured to switch to the second control state upon determining the second parameter is a prescribed value or greater while in the first control state.

The eighth aspect of the human-powered vehicle control device is configured to suppress the change of the transmission ratio upon determining the second parameter is the prescribed value or greater.

In a ninth aspect of the human-powered vehicle control device according to any one of the first to the eighth aspects, the electronic controller is configured to switch between the first control state and the second control state in accordance with an output of an eighth detection unit, which detects a connection between a rider's shoe and a shoe connection mechanism of the pedal as information relating to the pedaling preparation state.

The ninth aspect of the human-powered vehicle control device is configured to suitably detect the connection with the shoe connection mechanism on the pedal by means of the eighth detection unit.

In a tenth aspect of the human-powered vehicle control device according to the ninth aspect, the electronic controller is configured to switch to the second control state while in the first control state upon determining at least one shoe of the rider is removed from the shoe connection mechanism.

The tenth aspect of the human-powered vehicle control device is configured to suppress the change of the transmission ratio upon determining at least one shoe of the rider is removed from the shoe connection mechanism.

In an eleventh aspect of the human-powered vehicle control device according to any one of the first to the nineteenth aspects, the first prescribed set of conditions include a travel state and a travel environment of the human-powered vehicle.

The eleventh aspect of the human-powered vehicle control device is configured to suitably control the transmission upon determining in the first control state in accordance with the travel state and the travel environment of the human-powered vehicle.

In a twelfth aspect of the human-powered vehicle control device according to any one of the first to the eleventh aspects, the electronic controller is configured to control the transmission to not change the transmission ratio in accordance with the first prescribed set of conditions while in the second control state.

The twelfth aspect of the human-powered vehicle control device is configured to further suppress the change of the transmission ratio upon determining in the second control state.

In a thirteenth aspect of the human-powered vehicle control device according to the twelfth aspect, the electronic controller is configured to control the transmission to change the transmission ratio upon determining a parameter related to a travel state and a travel environment of the human-powered vehicle is outside of a first range while in the first control state, and the electronic controller is configured to control the transmission to change the transmission ratio upon determining the parameter is outside a second range, which is wider than the first range, while in the second control state.

The thirteenth aspect of the human-powered vehicle control device is configured to further suppress the change of the transmission ratio upon determining in the second control state.

The human-powered vehicle control device according to a fourteenth aspect of the present invention comprises an electronic controller that is configured to control a transmission that changes a transmission ratio of a human-powered vehicle, wherein the electronic controller is configured to switch between a first control state that controls the transmission to change the transmission ratio in accordance with a first prescribed set of conditions, and a second control state that controls the transmission to suppress the change of the transmission ratio as compared to the electronic controller being in the first control state in accordance with a second prescribed set of conditions. The electronic controller is configured to select between one of a first mode for switching from the first control state to the second control state upon determining the second prescribed set of conditions is met, and a second mode in which the first control state is maintained even upon determining the second prescribed set of conditions is met, in accordance with an instruction from a rider.

According to the fourteenth aspect of the human-powered vehicle control device, the rider can select between the first mode and the second mode.

The human-powered vehicle control device according to the present invention is configured to suitably control the transmission.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

A human-powered vehicle control device 50 according to an embodiment will be described with reference to FIGS. 1 to 16. The human-powered vehicle control device 50 will hereinafter be referred to simply as the control device 50. The control device 50 is provided in a human-powered vehicle 10. The human-powered vehicle 10 is a vehicle that can be driven at least by a human drive force. The human-powered vehicle 10 includes, for example, a bicycle. The number of wheels is not limited, and the human-powered vehicle 10 includes a vehicle having one wheel, or three or more wheels. Examples of the human-powered vehicle 10 include various types of bicycles, such as mountain bikes, road bikes, city bikes, cargo bikes, and recumbent bikes, as well as electric-assist bicycles (E-bikes). Hereinbelow, the human-powered vehicle 10 is described as a bicycle in the embodiment.

Figure 1:
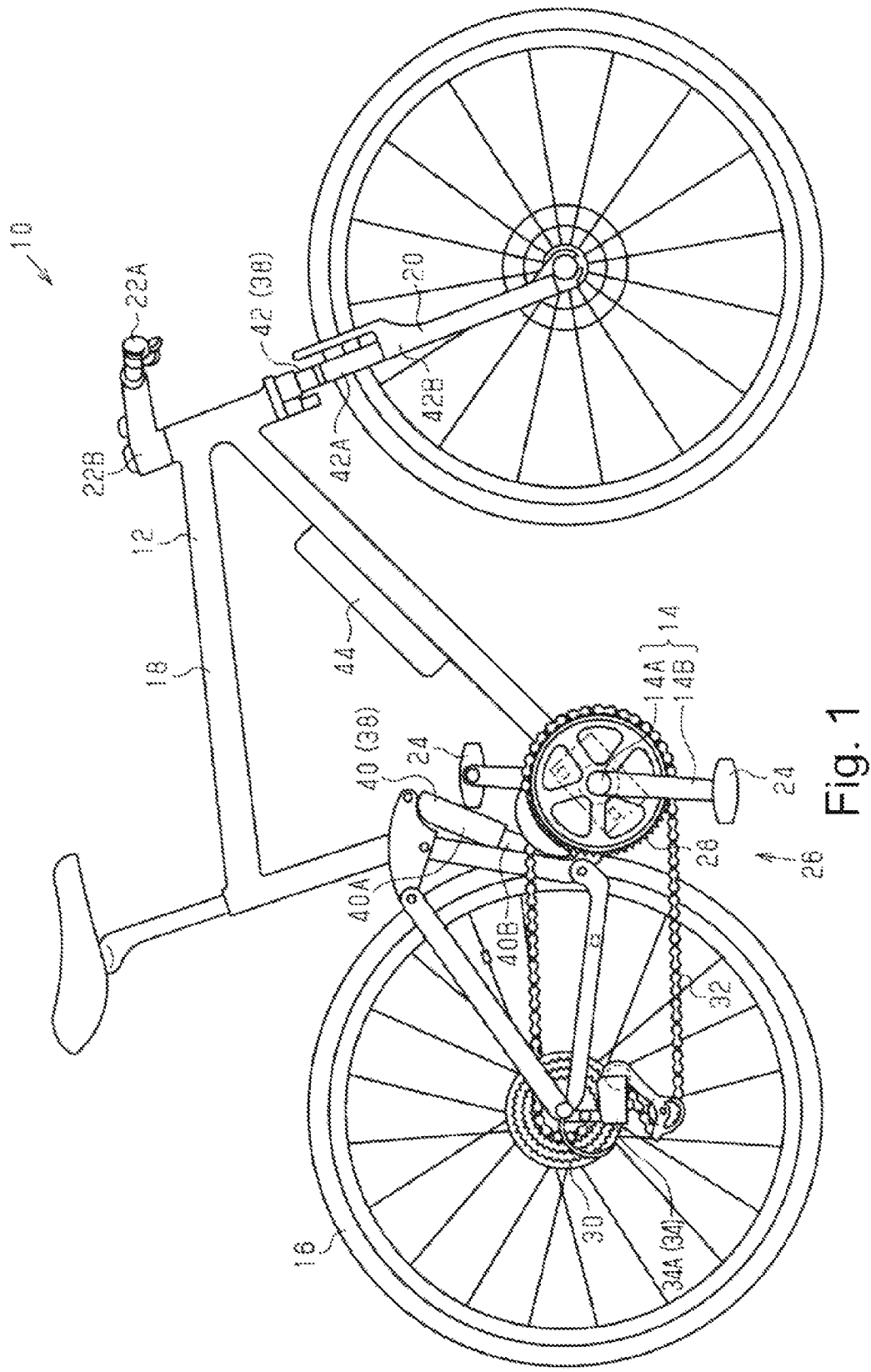
FIG. 1 is a side elevational view of a human-powered vehicle that includes a human-powered vehicle control device according to an illustrated embodiment.

As shown in FIG. 1, the human-powered vehicle 10 comprises a vehicle body 12, a crank 14, and a drive wheel 16. The vehicle body 12 includes a frame 18, a front fork 20, a handle 22A, and a stem 22B. A human drive force H is input to the crank 14. The crank 14 includes a crankshaft 14A that can be rotated relative to the frame 18, and crank arms 14B that are respectively provided at the axial ends of the crankshaft 14A. A pedal 24 is connected to each of the crank arms 14B. The drive wheel 16 is driven by means of rotation of the crank 14. The drive wheel 16 is supported by the frame 18. The crank 14 and the drive wheel 16 are connected by a drive mechanism 26. The drive mechanism 26 includes a first rotating body 28 that is coupled to the crankshaft 14A. The crankshaft 14A and the first rotating body 28 also can be coupled via a first one-way clutch. The first one-way clutch is configured such that the first rotating body 28 is rotated forward upon the crank 14 being rotated forward, and that the first rotating body 28 is prevented from rotating backward upon the crank 14 being rotated backward. The first rotating body 28 includes a sprocket, a pulley, or a bevel gear. The drive mechanism 26 further includes a second rotating body 30 and a connecting member 32. The connecting member 32 transmits a rotational force of the first rotating body 28 to the second rotating body 30. Examples of the connecting member 32 include a chain, a belt, and a shaft.

The second rotating body 30 is connected to the drive wheel 16. The second rotating body 30 includes a sprocket, a pulley, or a bevel gear. A second one-way clutch is preferably provided between the second rotating body 30 and the drive wheel 16. The second one-way clutch is configured such that the drive wheel 16 is rotated forward upon the second rotating body 30 being rotated forward and such that the drive wheel 16 is prevented from rotating backward upon the second rotating body 30 being rotated backward.

The human-powered vehicle 10 comprises a front wheel and a rear wheel. The front wheel is attached to the frame 18 via the front fork 20. The handle 22A is connected to the front fork 20 via the stem 22B. In the following embodiment, the rear wheel is described as the drive wheel 16, but the front wheel can be the drive wheel 16.

The human-powered vehicle 10 includes a transmission 34. The transmission 34 is configured to be driven by an electric actuator 36 (refer to FIG. 2). The transmission 34 constitutes a transmission device together with the electric actuator 36. The electric actuator 36 includes an electric motor. The transmission 34 is used for changing a transmission ratio R of a rotational speed of the drive wheel 16 relative to a rotational speed N of the crank 14. The transmission 34 is configured to change the transmission ratio R in stepwise fashion. The electric actuator 36 causes the transmission 34 to execute a shifting operation. The transmission 34 is controlled by an electronic controller 52 of the control device 50. The electronic controller 52 will hereinafter be referred to simply as the controller 52. The electric actuator 36 is connected so as to be capable of communication with the controller 52 by means of wired or wireless communication. The electric actuator 36 is capable of communication with the controller 52 by means of, for example, power line communication (PLC). The electric actuator 36 causes the transmission 34 to execute the shifting operation in accordance with a control signal from the controller 52. The transmission 34 includes at least one of an internal transmission and an external transmission (derailleur). The transmission 34 includes at least one of a rear transmission 34A and a front transmission. The rear transmission 34A changes a ratio of the rotational speed of the drive wheel 16 relative to the rotational speed N of the crank 14. Specifically, the rear transmission 34A changes the ratio of the turning radius of the second rotating body 30 that is connected to the connecting member 32 relative to the turning radius of the drive wheel 16. The transmission 34 can include the front transmission. The front transmission changes the ratio of the rotational speed of the drive wheel 16 relative to the rotational speed N of the crank 14. Specifically, the front transmission changes the ratio of the turning radius of the first rotating body 28 that is connected to the connecting member 32 relative to the turning radius of the crank 14. The transmission 34 can include both the rear transmission 34A and the front transmission.

The human-powered vehicle 10 can include a shock absorber 38. The shock absorber 38 includes at least one of a first damping unit 40 and a second damping unit 42. The shock absorber 38 absorbs shock that is applied to the wheel. The first damping unit 40 is configured to be provided between the rear wheel and the frame 18 of the human-powered vehicle 10. The first damping unit 40 collects the shock that is applied to the rear wheel. The first damping unit 40 includes a first portion 40A, and a second portion 40B, which is fitted in the first portion 40A and that can move relative to the first portion 40A. The first damping unit 40 can be a hydraulic suspension or an air suspension. The second damping unit 42 is configured to be provided between the front wheel and the frame 18 of the human-powered vehicle 10. More specifically, the second damping unit 42 is provided on the front fork 20. The second damping unit 42 absorbs the shock that is applied to the front wheel. The second damping unit 42 includes a first portion 42A, and a second portion 42B, which is fitted in the first portion 42A and that can move relative to the first portion 42A. The second damping unit 42 can be a hydraulic suspension or an air suspension.

Figure 2:
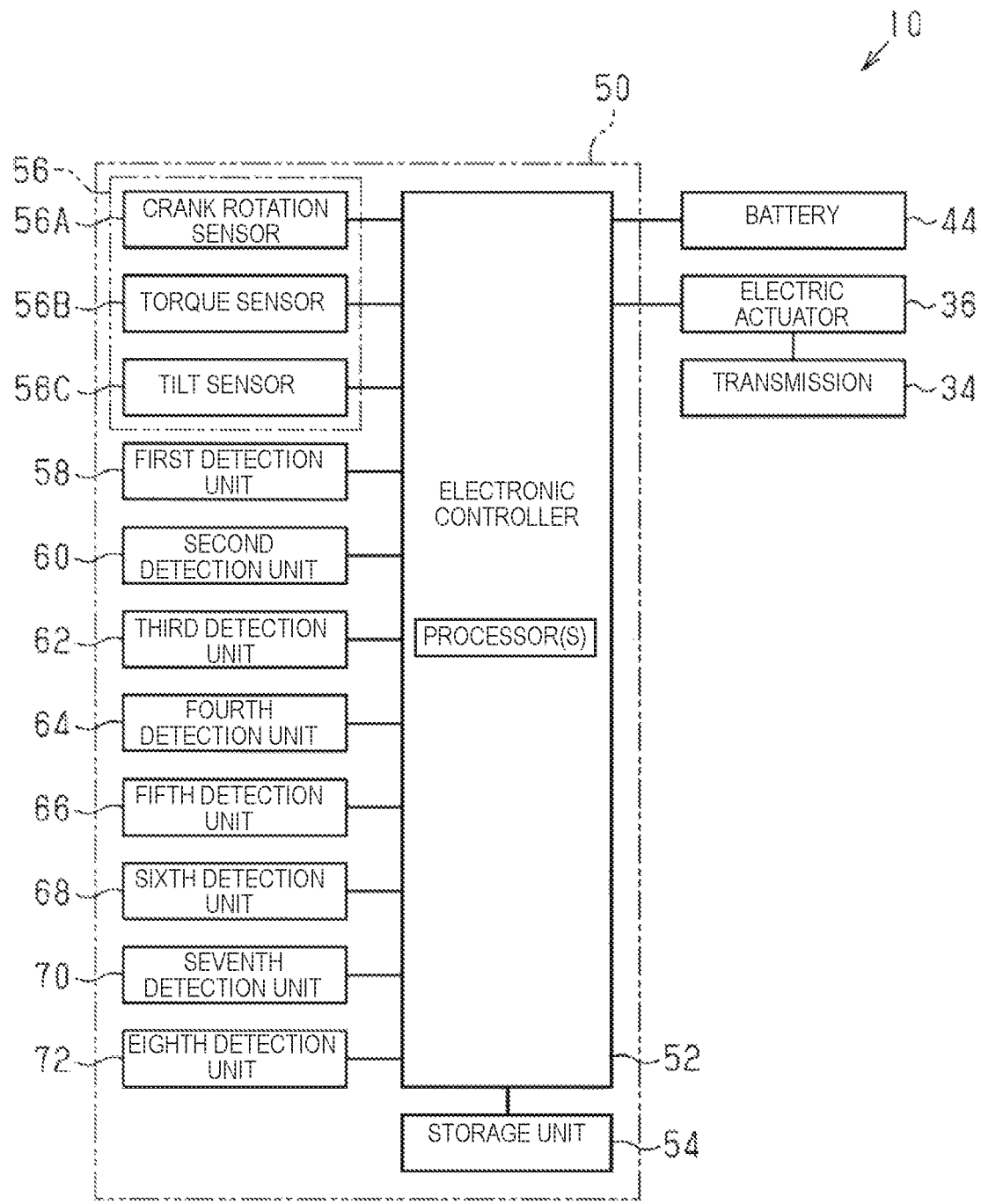
FIG. 2 is a block diagram showing an electrical configuration of the human-powered vehicle control device according to the illustrated embodiment.

As shown in FIG. 2, the human-powered vehicle 10 further comprises a battery 44. The battery 44 includes one or a plurality of battery cells. The battery cell includes a rechargeable battery. The battery 44 is provided on the human-powered vehicle 10 and supplies electric power to other electrical components that are electrically connected to the battery 44 by wire, such as the transmission 34 and the control device 50. The battery 44 is connected so as to be capable of communication with the controller 52 of the control device 50 by means of wired or wireless communication. The battery 44 is capable of communication with the controller 52 by means of, for example, power line communication (PLC). The battery 44 can be attached to the outside of the frame 18, or at least a portion thereof can be accommodated inside the frame 18.

As mentioned above, the control device 50 comprises the controller 52. The controller 52 includes a calculation processing device (one or more processors) that executes a prestored control program. The calculation processing device comprises, for example, a CPU (Central Processing Unit) or an MPU (Micro Processing Unit). The controller 52 can include one or a plurality of microcomputers. The controller 52 can include a plurality of calculation processing devices that are arranged in a plurality of separate locations. The terms "electronic controller" or "controller" as used herein refers to hardware that executes a software program. The terms "electronic controller" or "controller" as used herein do not include humans. The control device 50 further comprises a storage unit 54. The storage unit 54 stores control programs and information used for various control processes. The storage unit 54 is any computer storage device or any computer readable medium with the sole exception of a transitory, propagating signal. The storage unit 54 includes, for example, nonvolatile memory and volatile memory, and can includes a ROM (Read Only Memory) device, a RAM (Random Access Memory) device, a hard disk, a flash drive, etc. The controller 52 and the storage unit 54 are provided, for example, in the transmission 34.

The controller 52 controls the transmission 34, which changes the transmission ratio R of the human-powered vehicle 10. The controller 52 is configured to switch between a first control state and a second control state, in accordance with at least one of the motion state of the vehicle body 12 of the human-powered vehicle 10, the steering state of the human-powered vehicle 10, the surface condition of a travel path on which the human-powered vehicle 10 travels, and the pedaling preparation state relating to the pedals 24 of the human-powered vehicle 10. In the first control state, the controller 52 controls the transmission 34 to change the transmission ratio R in accordance with a first prescribed set of conditions. In the second control state, the controller 52 controls the transmission 34 to suppress the change of the transmission ratio R as compared to in the first control state. In the case that the transmission 34 includes both the rear transmission 34A and the front transmission, the controller 52 can control either the rear transmission 34A or the front transmission in accordance with the first prescribed set of conditions, or control the rear transmission 34A and/or the front transmission.

The motion state of the vehicle body 12 of the human-powered vehicle 10 indicates a state that affects the kinetic energy of the vehicle body 12 of the human-powered vehicle 10. The motion state of the vehicle body 12 of the human-powered vehicle 10 includes at least one of, for example, the attitude of the vehicle body 12 with respect to the travel path, a change in the attitude of the vehicle body 12 with respect to the travel path, the contact state between the travel path and the wheel of the human-powered vehicle 10, the rider's posture, and a change in the rider's posture. The steering state of the human-powered vehicle 10 indicates a state related to the operation of the handle 22A by the rider. The steering state of the human-powered vehicle 10 includes at least one of a steering angle SA of the handle 22A of the human-powered vehicle 10, and the rider's gripping state of the handle 22A of the human-powered vehicle 10. The surface condition of the travel path on which the human-powered vehicle 10 travels indicates the surface condition of the travel path that affects the behavior of the human-powered vehicle 10. The surface condition of the travel path on which the human-powered vehicle 10 travels includes at least one of, for example, the friction coefficient of the surface of the travel path, a wet state of the travel path, a snow-packed state of the travel path, and a paved state of the travel path. The pedaling preparation state relating to the pedals 24 of the human-powered vehicle 10 indicates a state related to the equipping of at least one of the human-powered vehicle 10 and the rider related to pedaling. The pedaling preparation state relating to the pedals 24 of the human-powered vehicle 10 includes at least one of, for example, a state relating to the connection between the rider's shoe and a shoe connection mechanism on the pedals 24, the type of the connecting portion of the shoe that is connected to the shoe connection mechanism, and a state of deterioration of the connecting portion of the shoe.

The first prescribed set of conditions includes a travel state and a travel environment of the human-powered vehicle 10. In the first control state, the controller 52 controls the transmission 34 to change the transmission ratio R if a parameter P relating to the travel state and the travel environment of the human-powered vehicle 10 is outside of a first range. The parameter P includes at least one of, for example, a rotational speed N of the crank 14, the human drive force H, and a road surface gradient. The control device 50 preferably further comprises a detection unit 56 for detecting the parameter P. The controller 52 preferably controls the transmission 34 such that the parameter P changes to within the first range, if the parameter P is outside of the first range.

In the case that the parameter P includes the rotational speed N of the crank 14, the controller 52 controls the transmission 34 such that the transmission ratio R increases if the rotational speed N of the crank 14 becomes greater than an upper limit value of the first range, and controls the transmission 34 such that the transmission ratio R decreases if the rotational speed N of the crank 14 becomes smaller than a lower limit value of the first range. In this case, the detection unit 56 includes a crank rotation sensor 56A.

The crank rotation sensor 56A is used for detecting the rotational speed N of the crank 14 of the human-powered vehicle 10. The crank rotation sensor 56A is, for example, attached to the frame 18 of the human-powered vehicle 10. The crank rotation sensor 56A is configured to include a magnetic sensor that outputs a signal corresponding to the magnetic field strength. An annular magnet in which the magnetic field strength changes in the circumferential direction is provided on the crankshaft 14A or on a power transmission path extending from the crankshaft 14A to the first rotating body 28. The crank rotation sensor 56A is connected so as to be capable of communication with the controller 52 by means of wired or wireless communication. The crank rotation sensor 56A outputs a signal corresponding to the rotational speed N of the crank 14 to the controller 52. The crank rotation sensor 56A can be provided on a member that rotates integrally with the crankshaft 14A on a power transmission path of the human drive force H extending from the crankshaft 14A to the first rotating body 28. For example, in the case that the first one-way clutch is not provided between the crankshaft 14A and the first rotating body 28, the crank rotation sensor 56A can be provided on the first rotating body 28.

In the case that the parameter P includes the human drive force H, the controller 52 controls the transmission 34 such that the transmission ratio R decreases if the human drive force H becomes greater than the upper limit value of the first range, and controls the transmission 34 such that the transmission ratio R increases if the human drive force H becomes smaller than the lower limit value of the first range. In this case, the detection unit 56 includes a torque sensor 56B.

The torque sensor 56B is used for detecting the torque of the human drive force H. The torque sensor 56B is, for example, provided on the crankshaft 14A. The torque sensor 56B detects the torque of the human drive force H that is input to the crank 14. For example, in the case that the first one-way clutch is provided on the power transmission path, the torque sensor 56B is provided on the upstream side of first one-way clutch. The torque sensor 56B includes a strain sensor, a magnetostrictive sensor, or the like. The strain sensor includes a strain gauge. In the case that the torque sensor 56B includes the strain sensor, the strain sensor is preferably provided on the outer peripheral portion of a rotating body included in the power transmission path. The torque sensor 56B can include a wireless or wired communication unit. The communication unit of the torque sensor 56B is configured to be capable of communicating with the controller 52.

In the case that the parameter P includes the road surface gradient, the controller 52 controls the transmission 34 such that the transmission ratio R decreases if the road surface gradient becomes greater than the upper limit value of the first range, and controls the transmission 34 such that the transmission ratio R increases if the road surface gradient becomes smaller than the lower limit value of the first range. In this case, the detection unit 56 includes a gradient sensor 56C.

The gradient sensor 56C is used for detecting the gradient of the road surface on which the human-powered vehicle 10 travels. The gradient sensor 56C includes a tilt sensor for detecting the pitch angle of the human-powered vehicle 10. The tilt sensor can detect the pitch angle of the human-powered vehicle 10 as the gradient of the road surface on which the human-powered vehicle 10 travels. The gradient of the road surface on which the human-powered vehicle 10 travels can be detected by the pitch angle of the human-powered vehicle 10 in the travel direction. The gradient of the road surface on which the human-powered vehicle 10 travels corresponds to the tilt angle of the human-powered vehicle 10. The gradient sensor 56C includes the tilt sensor. One example of the tilt sensor is a gyro sensor or an acceleration sensor. In another example, the gradient sensor 56C includes a GPS (Global Positioning System) receiver. The controller 52 can calculate the gradient of the road surface on which the human-powered vehicle 10 travels in accordance with GPS information acquired by the GPS receiver and the road surface gradient that is included in map information that is prestored in the storage unit 54.

According to one example, the controller 52 controls the transmission 34 to not change the transmission ratio R in accordance with the first prescribed set of conditions, if in the second control state. In this case, the controller 52 does not control the transmission 34 even if the parameter P is outside of the first range.

Figure 3:
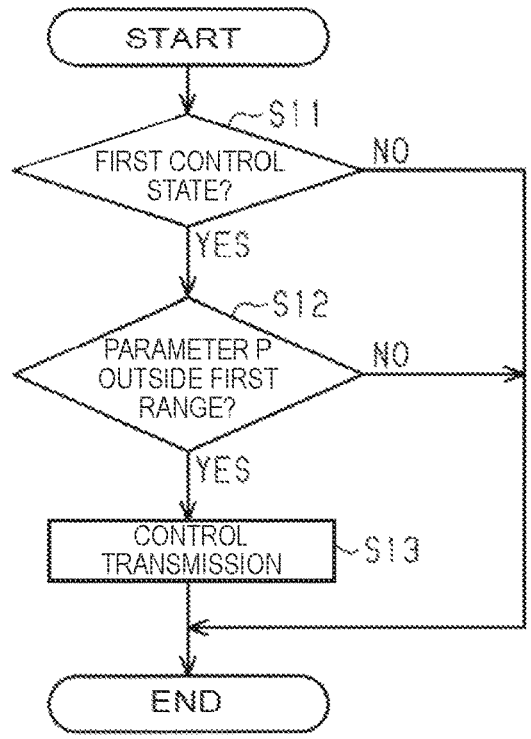
FIG. 3 is a flow chart of a process for changing a transmission ratio in a first control state that is executed by an electronic controller of FIG. 2.

The process for changing the transmission ratio R in the first control state will be described with reference to FIG. 3. If electric power is supplied to the controller 52 from the battery 44, then the controller 52 initiates the process and proceeds to Step S11 of the flow chart shown in FIG. 3. The controller 52 executes the process from Step S11 each prescribed cycle as long as electric power is being supplied.

The controller 52 determines whether it is in the first control state in Step S11. If it is not in the first control state, then the controller 52 ends the process. If it is in the first control state, then the controller 52 proceeds to Step S12.

In Step S12, the controller 52 determines whether the parameter P is outside of the first range. If the parameter P is outside of the first range, then the controller 52 proceeds to Step S13. In Step S13, the controller 52 controls the transmission 34 to change the transmission ratio R and ends the process. In Step S13, the controller 52 does not control the transmission 34 if the transmission ratio R cannot be changed. For example, the controller 52 does not control the transmission 34, if attempting to increase the transmission ratio R in order to change the parameter P to be within the first range, but the transmission ratio R is at the maximum transmission ratio R. For example, the controller 52 does not control the transmission 34, if attempting to decrease the transmission ratio R in order to change the parameter P to be within the first range, but the transmission ratio R is at the minimum transmission ratio R.

If it is not in the first control state in Step S11, then the controller 52 ends the process without controlling the transmission 34. Accordingly, the controller 52 does not control the transmission 34 if it is in the second control state.

Figure 4:
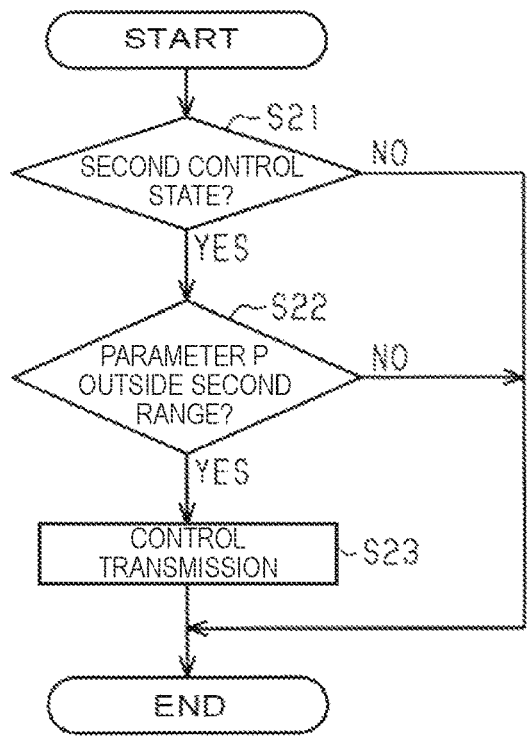
FIG. 4 is a flow chart of the process for changing the transmission ratio in a second control state that is executed by the electronic controller of FIG. 2.

In another example, if in the second control state, if the parameter P is outside a second range, which is wider than the first range, the controller 52 controls the transmission 34 to change the transmission ratio R. Specifically, the upper limit value of the second range is larger than the upper limit value of the first range, or the lower limit value of the second range is smaller than the lower limit value of the second range, or the upper limit value of the second range is larger than the upper limit value of the first range and the lower limit value of second range is smaller than the lower limit value of the second range. In this case, the process shown in FIG. 4 is executed in addition to the process shown in FIG. 3.

The process for changing the transmission ratio R in the second control state will be described with reference to FIG. 4. If electric power is supplied to the controller 52 from the battery 44, then the controller 52 initiates the process and proceeds to Step S21 of the flow chart shown in FIG. 4. The controller 52 executes the process from Step S21 each prescribed cycle as long as the electric power is being supplied.

The controller 52 determines whether it is in the second control state in Step S21. If it is not in the second control state in Step S21, then the controller 52 ends the process. If it is not in the second control state, then the controller 52 ends the process. If it is in the second control state, the controller 52 proceeds to Step S22.

In Step S22, the controller 52 determines whether the parameter P is outside of the second range. If the parameter P is outside of the second range, then the controller 52 proceeds to Step S23. In Step S23, the controller 52 controls the transmission 34 to change the transmission ratio R and ends the process. In Step S23, the controller 52 does not control the transmission 34 if the transmission ratio R cannot be changed. For example, the controller 52 does not control the transmission 34 if attempting to increase the transmission ratio R in order to change the parameter P to be within the second range but the transmission ratio R is at the maximum transmission ratio R. For example, the controller 52 does not control the transmission 34 if attempting to decrease the transmission ratio R in order to change the parameter P to be within the second range but the transmission ratio R is at the minimum transmission ratio R.

The controller 52, if in the first control state, switches to the second control state if a condition for switching to the second control state, relating to at least one of the motion state of the vehicle body 12 of the human-powered vehicle 10, the steering state of the human-powered vehicle 10, the surface condition of the travel path on which the human-powered vehicle 10 travels, and the pedaling preparation state relating to the pedals 24 of the human-powered vehicle 10, is met. The controller 52, if in the second control state, switches to the first control state if a condition for switching to the first control state is met. The condition for switching to the second control state and the condition for switching to the first control state can be opposing conditions. The condition for switching to the second control state can use a determination value that is different from that of the condition for switching to the first control state. The condition for switching to the second control state can be different from the condition for switching to the first control state.

The motion state includes at least one of the attitude of the vehicle body 12 with respect to the travel path and a change in the attitude. The attitude of the vehicle body 12 with respect to the travel path includes at least one of a yaw angle DY of the vehicle body 12 and a roll angle DR of the vehicle body 12.

The controller 52 switches between the first control state and the second control state in accordance with an output of a first detection unit 58, which detects at least one of the yaw angle DY and the roll angle DR as information relating to the motion state. In this case, the control device 50 preferably further includes the first detection unit 58. In one example, the first detection unit 58 includes the tilt sensor. One example of the tilt sensor is a gyro sensor or an acceleration sensor. The first detection unit 58 is configured similarly to the tilt sensor of the gradient sensor 56C. If the gradient sensor 56C includes the tilt sensor, the first detection unit 58 can be integrated with the gradient sensor 56C.

In the first example, the controller 52, if in the first control state, switches to the second control state if at least one of the yaw angle DY of the vehicle body 12 and the roll angle DR of the vehicle body 12 is greater than a first angle DX. For example, at least one of the yaw angle DY and the roll angle DR becomes large if the human-powered vehicle 10 is turning, is in a slalom, or is passing through a tight corner. If the first angle DX corresponds to the yaw angle DY, the first angle DX is set to an angle that corresponds to the yaw angle DY if the human-powered vehicle 10 is turning, is in a slalom, or is passing through a tight corner. If the first angle DX corresponds to the roll angle DR, the first angle DX is set to an angle that corresponds to the roll angle DR if the human-powered vehicle 10 is turning, is in a slalom, or is passing through a tight corner.

Figure 5:
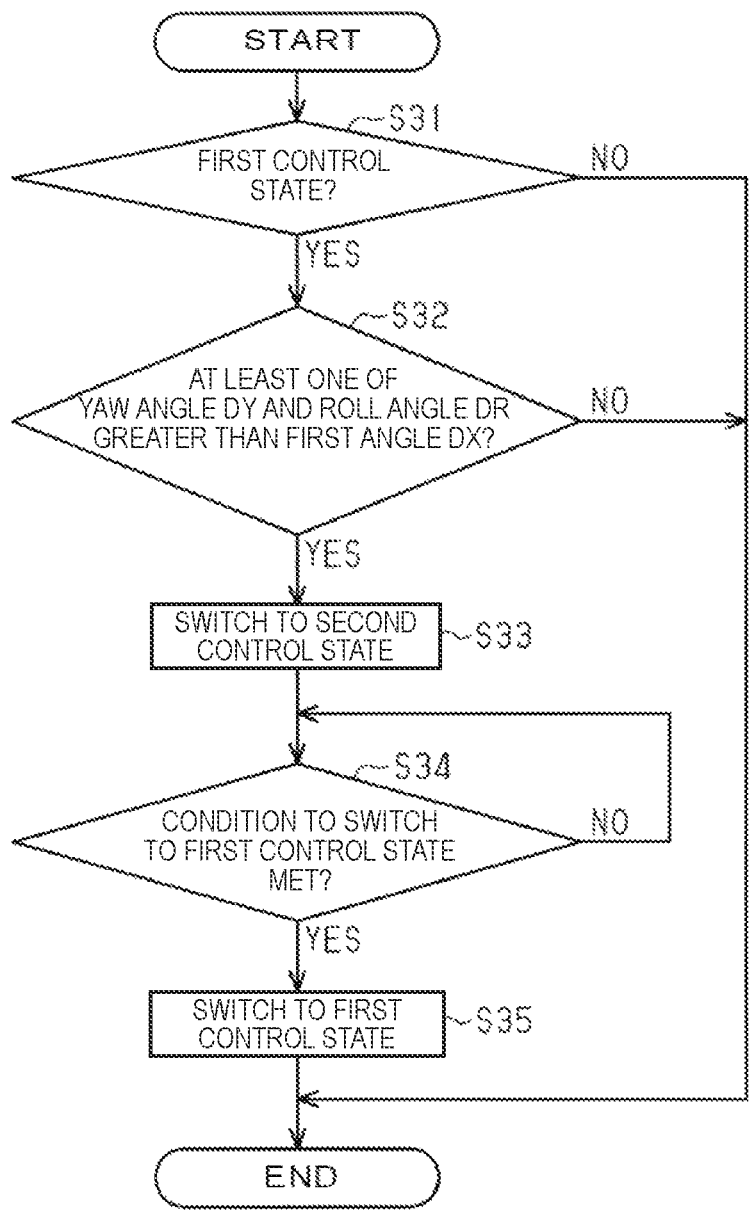
FIG. 5 is a flow chart of a process for switching between a first control state and a second control state in a first example executed by the electronic controller of FIG. 2.

The process for switching between the first control state and the second control state according to the first example will be described with reference to FIG. 5. If electric power is supplied to the controller 52 from the battery 44, the controller 52 initiates the process and proceeds to Step S31 of the flow chart shown in FIG. 5. The controller 52 executes the process from Step S31 each prescribed cycle as long as the electric power is being supplied.

The controller 52 determines whether it is in the first control state in Step S31. If it is not in the first control state, the controller 52 ends the process. If it is in the first control state, then the controller 52 proceeds to Step S32.

In Step S32, the controller 52 determines whether at least one of the yaw angle DY and the roll angle DR is greater than the first angle DX. If at least one of the yaw angle DY and the roll angle DR is not greater than the yaw angle DY nor the roll angle DR is greater than the first angle DX, then the controller 52 ends the process. If at least one of the yaw angle DY and the roll angle DR is greater than the first angle DX, then the controller 52 proceeds to Step S33.

The controller 52 can be configured to proceed to Step S33 if the yaw angle DY is greater than the first angle DX in Step S32. The controller 52 can be configured to proceed to Step S33 if the roll angle DR is greater than the first angle DX. The controller 52 can be configured to proceed to Step S33 if the yaw angle DY is greater than the first angle DX that is set with respect to the yaw angle DY, and the roll angle DR is greater than the first angle DX that is set with respect to the roll angle DR.

In Step S33, the controller 52 switches to the second control state and proceeds to Step S34. In Step S34, the controller 52 determines whether the condition for switching to the first control state is met. In the case that the condition for switching to the first control state is the opposite of the condition for switching to the second control state, the condition for switching to the first control state is satisfied if the at least one of the yaw angle DY and the roll angle DR is not greater than the first angle DX. The controller 52 repeats the determination process of Step S34 until the condition for switching to the first control state is met. If the condition for switching to the first control state is met, then the controller 52 proceeds to Step S35. In Step S35, the controller 52 switches to the first control state and ends the process.

The condition for switching to the first control state can be configured to be satisfied if a prescribed period of time has elapsed after switching to the second control state. In this case, the controller 52 can determine that the condition for switching to the first control state has been met in Step S34 if the prescribed period of time has elapsed after switching to the second control state in Step S33.

In the second example, the controller 52, if in the first control state, switches to the second control state if at least one of the yaw angle DY and the roll angle DR repeatedly increases and decreases within a first period of time T1. For example, in the case that the human-powered vehicle 10 is wobbling, or traveling in a location where there are many obstacles, such as in the city, at least one of the yaw angle DY and the roll angle DR frequently increases and decreases. The first period of time T1 is set to a period of time with which it is possible to determine a repeated increase and decrease of the yaw angle DY and the roll angle DR, in the case that the human-powered vehicle 10 is wobbling, or traveling in a location where there are many obstacles, such as in the city. For example, the controller 52 determines that at least one of the yaw angle DY and the roll angle DR has repeatedly increased and decreased within the first period of time T1 if an increase of a first prescribed angle or more as well as a decrease of a second prescribed angle or more have respectively occurred a prescribed number of times or more in at least one of the yaw angle DY and the roll angle DR, within the first period of time T1.

Figure 6:
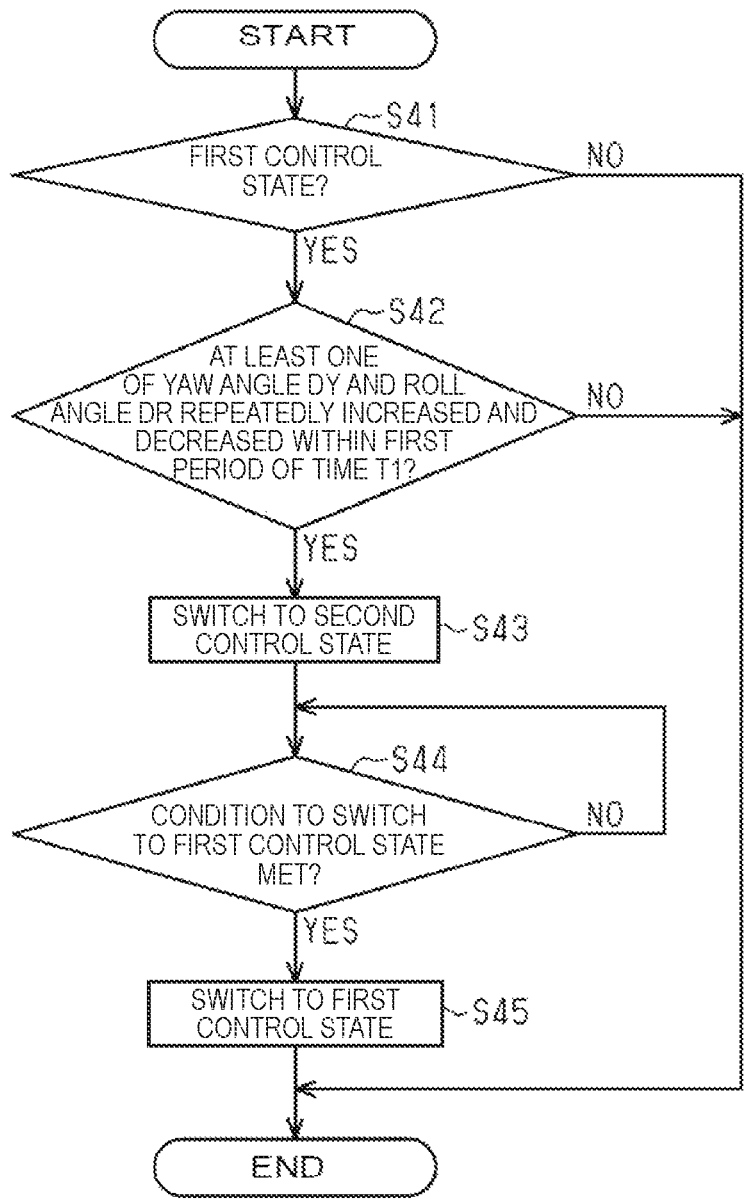
FIG. 6 is a flow chart of the control process for switching between the first control state and the second control state in a second example executed by the electronic controller of FIG. 2.

The process for switching between the first control state and the second control state according to the second example will be described with reference to FIG. 6. If electric power is supplied to the controller 52 from the battery 44, the controller 52 initiates the process and proceeds to Step S41 of the flow chart shown in FIG. 6. The controller 52 executes the process from Step S41 each prescribed cycle as long as electric power is being supplied.

The controller 52 determines whether it is in the first control state in Step S41. If it is not in the first control state, then the controller 52 ends the process. If it is in the first control state, then the controller 52 proceeds to Step S42.

In Step S42, the controller 52 determines whether at least one of the yaw angle DY and the roll angle DR has repeatedly increased and decreased within the first period of time T1. If at least one of the yaw angle DY and the roll angle DR has not repeatedly increased and decreased within the first period of time T1, then the controller 52 ends the process. If at least one of the yaw angle DY and the roll angle DR has repeatedly increased and decreased within the first period of time T1, then the controller 52 proceeds to Step S43.

The controller 52 can be configured to proceed to Step S43, if the yaw angle DY repeatedly increases and decreases within the first period of time T1 in Step S42. The controller 52 can be configured to proceed to Step S43 if the roll angle DR repeatedly increases and decreases within the first period of time T1. The controller 52 can be configured to proceed to Step S43 if both the yaw angle DY and the roll angle DR repeatedly increase and decrease within the first period of time T1.

In Step S43, the controller 52 switches to the second control state and proceeds to Step S44. In Step S44, the controller 52 determines whether the condition for switching to the first control state is met. In the case that the condition for switching to the first control state is the opposite of the condition for switching to the second control state, the condition for switching to the first control state is satisfied if the at least one of the yaw angle DY and the roll angle DR has not repeatedly increased and decreased within the first period of time T1. The controller 52 repeats the determination process of Step S44 until the condition for switching to the first control state is met. If the condition for switching to the first control state is met, then the controller 52 proceeds to Step S45. In Step S45, the controller 52 switches to the first control state and ends the process.

The condition for switching to the first control state can be configured to be satisfied if a prescribed period of time has elapsed after switching to the second control state. In this case, the controller 52 can determine that the condition for switching to the first control state has been met in Step S44 if the prescribed period of time has elapsed after switching to the second control state in Step S43.

In the third example, the controller 52 switches between the first control state and the second control state in accordance with an output of a second detection unit 60, which detects at least one of the pitch angle DP of the vehicle body 12, the vertical displacement of the vehicle body 12, and the suspension stroke amount Las information relating to the motion state. In this case, the control device 50 preferably further includes the second detection unit 60.

In the case that the second detection unit 60 detects the pitch angle DP, the second detection unit 60 includes the tilt sensor. One example of the tilt sensor is a gyro sensor or an acceleration sensor. The second detection unit 60 is configured similarly to the tilt sensor of the gradient sensor 56C. If the gradient sensor 56C includes the tilt sensor, then the second detection unit 60 can be integrated with the gradient sensor 56C.

In the case that the second detection unit 60 detects the vertical displacement of the vehicle body 12, the second detection unit 60 includes the acceleration sensor. If the control device 50 includes the first detection unit 58 and the first detection unit 58 includes the acceleration sensor that detects the vertical acceleration of the human-powered vehicle 10, the second detection unit 60 can be integrated with the first detection unit 58. If the gradient sensor 56C includes the acceleration sensor that detects the vertical acceleration of the human-powered vehicle 10, then the second detection unit 60 can be integrated with the gradient sensor 56C.

In the case that the second detection unit 60 detects the suspension stroke amount L, the second detection unit 60 detects the position of one of either the first portions 40A, 42A or the second portions 40B, 42B relative to the other portions, that is, either the second portions 40B, 42B or the first portions 40A, 42A. The second detection unit 60 includes, for example, a linear encoder.

In one example of the third example, in the first control state, the controller 52 switches to the second control state if at least one of the pitch angle DP of the vehicle body 12, a value relating to a rate of change of the pitch angle DP of the vehicle body 12, the vertical displacement of the vehicle body 12, a value relating to the rate of change of the vertical displacement of the vehicle body 12, the suspension stroke amount L, and a value relating to the rate of change of the suspension stroke amount L, becomes greater than or equal to a first prescribed value. The value relating to the rate of change of the pitch angle DP of the vehicle body 12 includes the rate of change of the pitch angle DP of the vehicle body 12 as well as a value obtained by differentiating the rate of change with respect to time at least once. The value relating to the rate of change of the vertical displacement of the vehicle body 12 includes the rate of change of the vertical displacement of the vehicle body 12 as well as a value obtained by differentiating the rate of change with respect to time at least once. The value relating to the rate of change of the suspension stroke amount L includes the rate of change of the suspension stroke amount L as well as a value obtained by differentiating the rate of change with respect to time at least once.

For example, if the human-powered vehicle 10 rides up onto an obstacle or travels over a step, then at least one of the pitch angle DP of the vehicle body 12, the value relating to the rate of change of the pitch angle DP of the vehicle body 12, the vertical displacement of the vehicle body 12, the value relating to the rate of change of the vertical displacement of the vehicle body 12, the suspension stroke amount L, and the value relating to the rate of change of the suspension stroke amount L becomes large. The first prescribed value is set to a value that is suitable for the pitch angle DP of the vehicle body 12, the value relating to the rate of change of the pitch angle DP of the vehicle body 12, the vertical displacement of the vehicle body 12, the value relating to the rate of change of the vertical displacement of the vehicle body 12, the suspension stroke amount L, or the value relating to the rate of change of the suspension stroke amount L, if the human-powered vehicle 10 rides up onto an obstacle or travels over a step. The first prescribed value can be changed based on a vehicle speed V of the human-powered vehicle 10. For example, the controller 52 sets the first prescribed value to be larger if the vehicle speed V is greater than or equal to a prescribed speed VA as compared to if the vehicle speed V is less than the prescribed speed VA. For example, the controller 52 sets the first prescribed value to be smaller if the vehicle speed V is greater than or equal to the prescribed speed VA as compared to if the vehicle speed V is less than the prescribed speed VA. The controller 52, if in the first control state, can be configured to switch to the second control state, if at least one of the pitch angle DP of the vehicle body 12, the value relating to the rate of change of the pitch angle DP of the vehicle body 12, the vertical displacement of the vehicle body 12, the value relating to the rate of change of the vertical displacement of the vehicle body 12, the suspension stroke amount L, and the value relating to the rate of change of the suspension stroke amount L becomes greater than or equal to the first prescribed value, and if the vehicle speed V is less than the prescribed speed VA. In the first control state, if at least one of the pitch angle DP of the vehicle body 12, the value relating to the rate of change of the pitch angle DP of the vehicle body 12, the vertical displacement of the vehicle body 12, the value relating to the rate of change of the vertical displacement of the vehicle body 12, the suspension stroke amount L, and the value relating to the rate of change of the suspension stroke amount L becomes greater than or equal to the first prescribed value, and if the vehicle speed V is greater than or equal to the prescribed speed VA, then the controller 52 can be configured to switch to the second control state.

Figure 7:
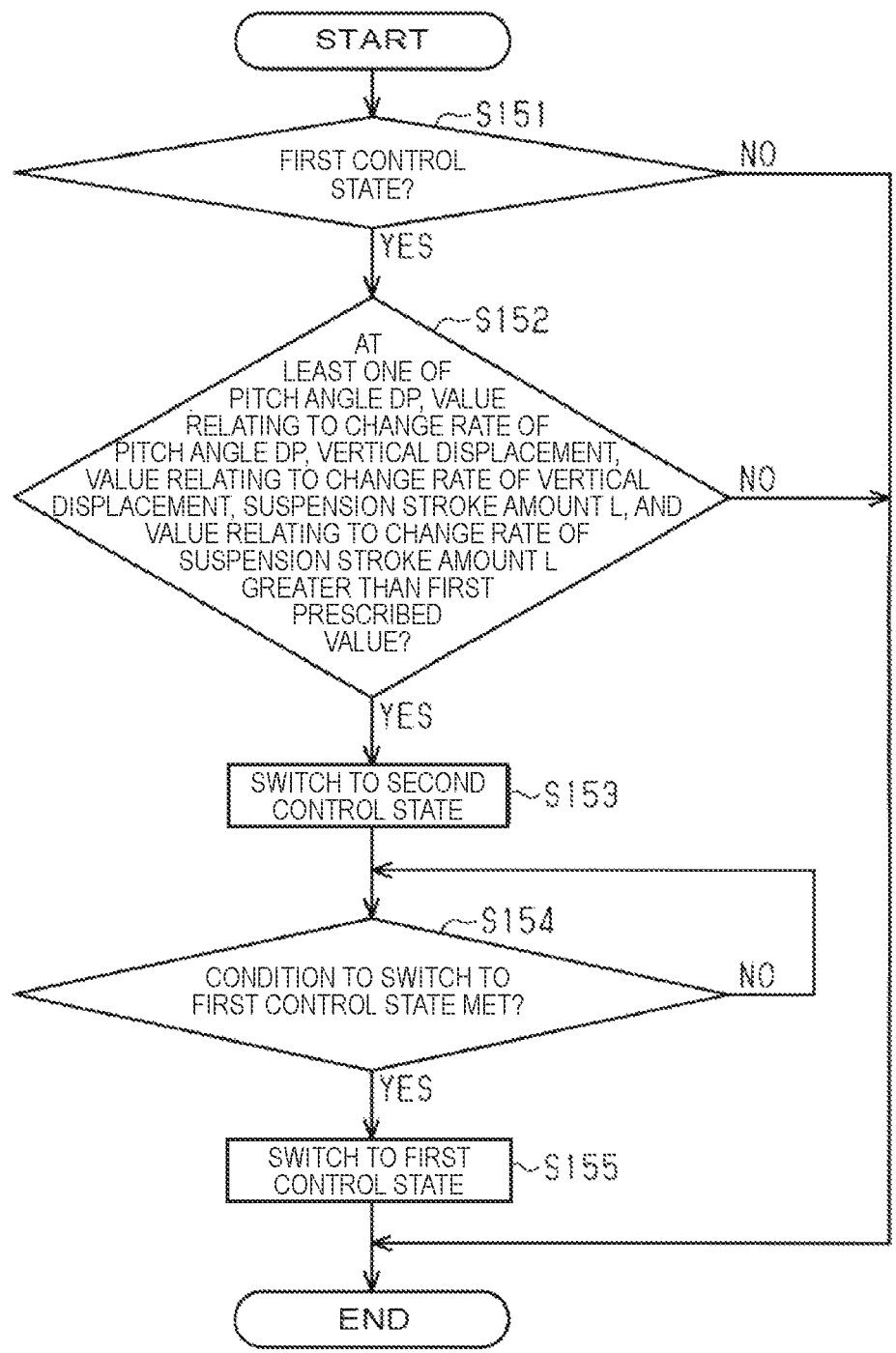
FIG. 7 is a flow chart of the control process for switching between the first control state and the second control state according to one example of a third example executed by the electronic controller of FIG. 2.

The process for switching between the first control state and the second control state according to one example of the third example will be described with reference to FIG. 7. If electric power is supplied to the controller 52 from the battery 44, then the controller 52 initiates the process and proceeds to Step S151 of the flow chart shown in FIG. 7. The controller 52 executes the process from Step S151 each prescribed cycle as long as electric power is being supplied.

The controller 52 determines whether it is in the first control state in Step S151. If it is not in the first control state, then the controller 52 ends the process. If it is in the first control state, then the controller 52 proceeds to Step S152.

In Step S152, the controller 52 determines whether at least one of the pitch angle DP of the vehicle body 12, the value relating to the rate of change of the pitch angle DP of the vehicle body 12, the vertical displacement of the vehicle body 12, the value relating to the rate of change of the vertical displacement of the vehicle body 12, the suspension stroke amount L, and the value relating to the rate of change of the suspension stroke amount L, has become greater than or equal to the first prescribed value. If none of the pitch angle DP of the vehicle body 12, the value relating to the rate of change of the pitch angle DP of the vehicle body 12, the vertical displacement of the vehicle body 12, the value relating to the rate of change of the vertical displacement of the vehicle body 12, the suspension stroke amount L, and the value relating to the rate of change of the suspension stroke amount L has become greater than or equal to the first prescribed value, then the controller 52 ends the process. If at least one of the pitch angle DP of the vehicle body 12, the value relating to the rate of change of the pitch angle DP of the vehicle body 12, the vertical displacement of the vehicle body 12, the value relating to the rate of change of the vertical displacement of the vehicle body 12, the suspension stroke amount L, and the value relating to the rate of change of the suspension stroke amount L has become greater than or equal to the first prescribed value, then the controller 52 proceeds to Step S153.

The controller 52 can be configured to proceed to Step S153 if the pitch angle DP repeatedly increases and decreases within a second period of time T2 in Step S152. The controller 52 can be configured to proceed to Step S153 if the vertical displacement of the vehicle body 12 repeatedly increases and decreases within the second period of time T2. The controller 52 can be configured to proceed to Step S153 if the suspension stroke amount L repeatedly increases and decreases within the second period of time T2. The controller 52 can be configured to proceed to Step S153 if two or more predetermined values from among the pitch angle DP, the vertical displacement of the vehicle body 12, and the suspension stroke amount L repeatedly increase and decrease within the second period of time T2 in Step S152.

In Step S153, the controller 52 switches to the second control state and proceeds to Step S154. In Step S154, the controller 52 determines whether the condition for switching to the first control state is met. In the case that the condition for switching to the first control state is the opposite of the condition for switching to the second control state, the condition for switching to the first control state is satisfied if the at least one of the pitch angle DP of the vehicle body 12, the value relating to the rate of change of the pitch angle DP of the vehicle body 12, the vertical displacement of the vehicle body 12, the value relating to the rate of change of the vertical displacement of the vehicle body 12, the suspension stroke amount L, and the value relating to the rate of change of the suspension stroke amount L is less than the first prescribed value. The controller 52 repeats the determination process of Step S154 until the condition for switching to the first control state is met. If the condition for switching to the first control state is met, then the controller 52 proceeds to Step S155. In Step S155, the controller 52 switches to the first control state and ends the process.

The condition for switching to the first control state can be configured to be satisfied if a prescribed period of time has elapsed after switching to the second control state. In this case, the controller 52 can determine that the condition for switching to the first control state has been met in Step S154, if the prescribed period of time has elapsed after switching to the second control state in Step S153.

In another example of the third example, in the first control state, if at least one of pitch angle DP of the vehicle body 12, the vertical displacement of the vehicle body 12, and the suspension stroke amount L repeatedly increases and decreases within the second period of time T2, the controller 52 switches to the second control state.

For example, if the human-powered vehicle 10 travels on an uneven road, at least one of the pitch angle DP, the vertical displacement of the vehicle body 12, and the suspension stroke amount L frequently increases and decreases. The second period of time T2 is set to a period of time with which it is possible to determine a repeated increase and decrease of the pitch angle DP, the vertical displacement of the vehicle body 12, and the suspension stroke amount L if the human-powered vehicle 10 travels on an uneven road.

For example, the controller 52 determines that at least one of the pitch angle DP, the vertical displacement of the vehicle body 12, and the suspension stroke amount L has repeatedly increased and decreased within the second period of time T2 if an increase of a second prescribed value or more as well as a decrease of a third prescribed value or more have respectively occurred a prescribed number of times or more in at least one of the pitch angle DP, the vertical displacement of the vehicle body 12, and the suspension stroke amount L, within the second period of time T2.

Figure 8:
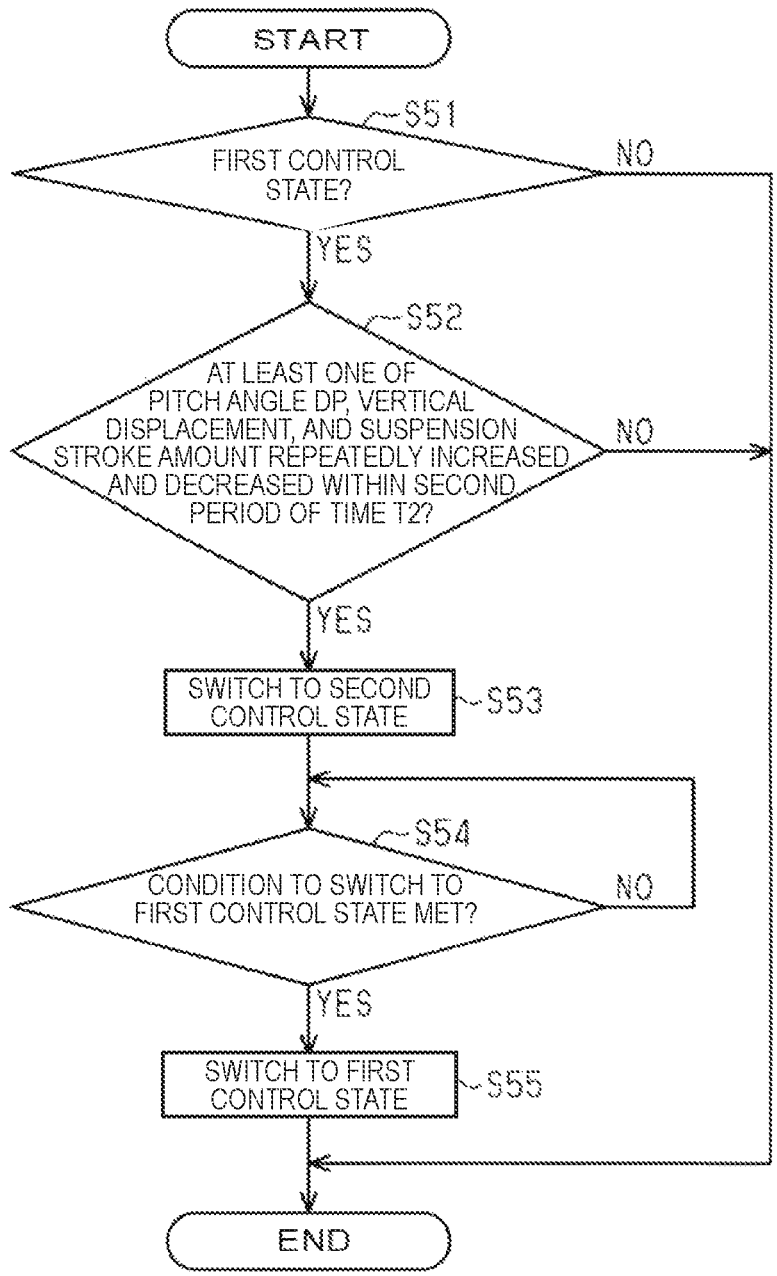
FIG. 8 is a flow chart of the control process for switching between the first control state and the second control state according to another example of the third example executed by the electronic controller of FIG. 2.

The process for switching between the first control state and the second control state according to another example of the third example will be described with reference to FIG. 8. If electric power is supplied to the controller 52 from the battery 44, then the controller 52 initiates the process and proceeds to Step S51 of the flow chart shown in FIG. 8. The controller 52 executes the process from Step S51 each prescribed cycle as long as electric power is being supplied.

The controller 52 determines whether it is in the first control state in Step S51. If it is not in the first control state, then the controller 52 ends the process. If it is in the first control state, then the controller 52 proceeds to Step S52.

In Step S52, the controller 52 determines whether at least one of the pitch angle DP, the vertical displacement of the vehicle body 12, and the suspension stroke amount L has repeatedly increased and decreased within the second period of time T2. If none of the pitch angle DP, the vertical displacement of the vehicle body 12, and the suspension stroke amount L has repeatedly increased and decreased within the second period of time T2, then the controller 52 ends the process. If at least one of the pitch angle DP, the vertical displacement of the vehicle body 12, and the suspension stroke amount L has repeatedly increased and decreased within the second period of time T2, then the controller 52 proceeds to Step S53.

The controller 52 can be configured to proceed to Step S53 if the pitch angle DP repeatedly increases and decreases within the second period of time T2 in Step S52. The controller 52 can be configured to proceed to Step S53 if the vertical displacement of the vehicle body 12 repeatedly increases and decreases within the second period of time T2. The controller 52 can be configured to proceed to Step S53 if the suspension stroke amount L repeatedly increases and decreases within the second period of time T2. The controller 52 can be configured to proceed to Step S53 if two or more predetermined values from among the pitch angle DP, the vertical displacement of the vehicle body 12, and the suspension stroke amount L repeatedly increase and decrease within the second period of time T2 in Step S52.

In Step S53, the controller 52 switches to the second control state and proceeds to Step S54. In Step S54, the controller 52 determines whether the condition for switching to the first control state is met. In the case that the condition for switching to the first control state is the opposite of the condition for switching to the second control state, the condition for switching to the first control state is satisfied if the at least one of the pitch angle DP, the vertical displacement of the vehicle body 12, and the suspension stroke amount L does not repeatedly increase and decrease within the second period of time T2. The controller 52 repeats the determination process of Step S54 until the condition for switching to the first control state is met. If the condition for switching to the first control state is met, then the controller 52 proceeds to Step S55. In Step S55, the controller 52 switches to the first control state and ends the process.

The condition for switching to the first control state can be configured to be satisfied if a prescribed period of time has elapsed after switching to the second control state. In this case, the controller 52 can determine that the condition for switching to the first control state has been met in Step S54 if the prescribed period of time has elapsed after switching to the second control state in Step S53.

In the fourth example, the controller 52 switches between the first control state and the second control state in accordance with an output of a third detection unit 62, which detects the contact state between the travel path and the wheel of the human-powered vehicle 10 as information relating to the motion state. In the first control state, the controller 52 switches to the second control state if the wheel leaves the travel path. In this case, the control device 50 preferably further includes the third detection unit 62. The third detection unit 62 detects at least one of the load applied to a hub shaft, the load applied to the shock absorber 38, and tire air pressure. In the case that the wheel leaves the travel path due to a front wheel lift, a wheelie, or the like, the load applied to the hub shaft and the load applied to the shock absorber 38 decrease. In addition, if the wheel leaves the travel path, the tire air pressure decreases. In the first control state, if the load applied to the hub shaft becomes less than or equal to a first load, if the load applied to the shock absorber 38 becomes less than or equal to a second load, and/or if the air pressure of the tire becomes less than or equal to a prescribed pressure, then the controller 52 switches to the second control state. The first load, the second load, and the prescribed pressure are set to values that correspond to the respective values if the wheel leaves the travel path.

Figure 9:
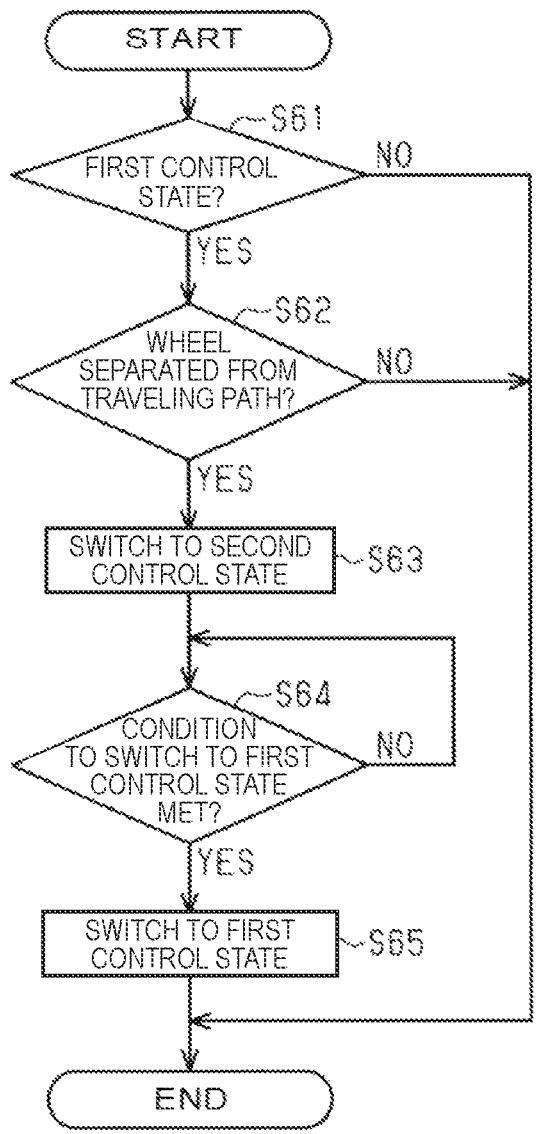
FIG. 9 is a flow chart of the control process for switching between the first control state and the second control state in a fourth example executed by the electronic controller of FIG. 2.

The process for switching between the first control state and the second control state according to the fourth example will be described with reference to FIG. 9. If electric power is supplied to the controller 52 from the battery 44, the controller 52 initiates the process and proceeds to Step S61 of the flow chart shown in FIG. 9. The controller 52 executes the process from Step S61 each prescribed cycle as long as electric power is being supplied.

The controller 52 determines whether it is in the first control state in Step S61. If it is not in the first control state, then the controller 52 ends the process. If it is in the first control state, then the controller 52 proceeds to Step S62.

The controller 52 determines whether the wheel has left the travel path in Step S62. If the wheel has not left the travel path, then the controller 52 ends the process. If the wheel has left the travel path, then the controller 52 proceeds to Step S63.

In Step S63, the controller 52 switches to the second control state and proceeds to Step S64. In Step S64, the controller 52 determines whether the condition for switching to the first control state is met. In the case that the condition for switching to the first control state is the opposite of the condition for switching to the second control state, the condition for switching to the first control state is satisfied if the wheel has not left the travel path. The controller 52 repeats the determination process of Step S64 until the condition for switching to the first control state is met. If the condition for switching to the first control state is met, the controller 52 proceeds to Step S65. In Step S65, the controller 52 switches to the first control state and ends the process.

The condition for switching to the first control state can be configured to be satisfied if a prescribed period of time has elapsed after switching to the second control state. In this case, the controller 52 can determine that the condition for switching to the first control state has been met in Step S64 if the prescribed period of time has elapsed after switching to the second control state in Step S63.

In the fifth example, the controller 52 switches between the first control state and the second control state in accordance with an output of a fourth detection unit 64, which detects a first parameter P1, which changes according to the rider's posture change, as information relating to the motion state. The controller 52, if in the first control state, switches to the second control state if the first parameter P1 enters a state that corresponds to the rider riding out of the saddle. In this case, the control device 50 preferably further includes the fourth detection unit 64.

In one example of the fifth example, the first parameter P1 includes the human drive force H that is input to the human-powered vehicle 10. In the first control state, if the magnitude of the human drive force H becomes a first value H1 or more, and/or if the relationship between the change in the human drive force H and the change in the phase of the crank 14 of the human-powered vehicle 10 becomes a prescribed relationship, the controller 52 switches to the second control state.

In the case that the first parameter P1 includes the human drive force H, the fourth detection unit 64 includes the torque sensor. The torque sensor is used to detect the torque of the human drive force H. In this case, the fourth detection unit 64 is configured similarly to the torque sensor 56B. The torque sensor can be integrated with the torque sensor 56B. The fourth detection unit 64 can include the torque sensor and the crank rotation sensor. In this case, the crank rotation sensor is configured similarly to the crank rotation sensor 56A. The crank rotation sensor can be integrated with the crank rotation sensor 56A.

For example, the magnitude of the torque of the human drive force H changes between if the rider's posture is sitting and if riding out of the saddle. If the rider's posture is riding out of the saddle, the torque of the human drive force H becomes larger than if the rider's posture is sitting. The first value H1 is set to a value that corresponds to the magnitude of the human drive force H if the rider's posture is riding out of the saddle. The controller 52 can determine that the rider's posture is riding out of the saddle if the magnitude of the torque of the human drive force H is greater than the first value H1 if a rotational phase of the crank 14 is in a prescribed range. The prescribed range preferably includes an angle that is 90 degrees away from the top dead center and the bottom dead center of the crank 14.

For example, the relationship between the change in the human drive force H and the change in the phase of the crank 14 of the human-powered vehicle 10 changes between if the rider's posture is sitting and if riding out of the saddle. Specifically, the phase of the crank 14 at which the torque of the human drive force H reaches a maximum is different between if the rider's posture is riding out of the saddle and if the rider's posture is sitting. The prescribed relationship is set to a relationship corresponding to the relationship between the change in the phase of the crank 14 of the human-powered vehicle 10 and the change in the human drive force H if the rider's posture is riding out of the saddle. For example, the controller 52 determines that the prescribed relationship is established if the phase of the crank 14 if the torque of the human drive force H reaches a maximum becomes the phase corresponding to if the rider is riding out of the saddle.

Figure 10:
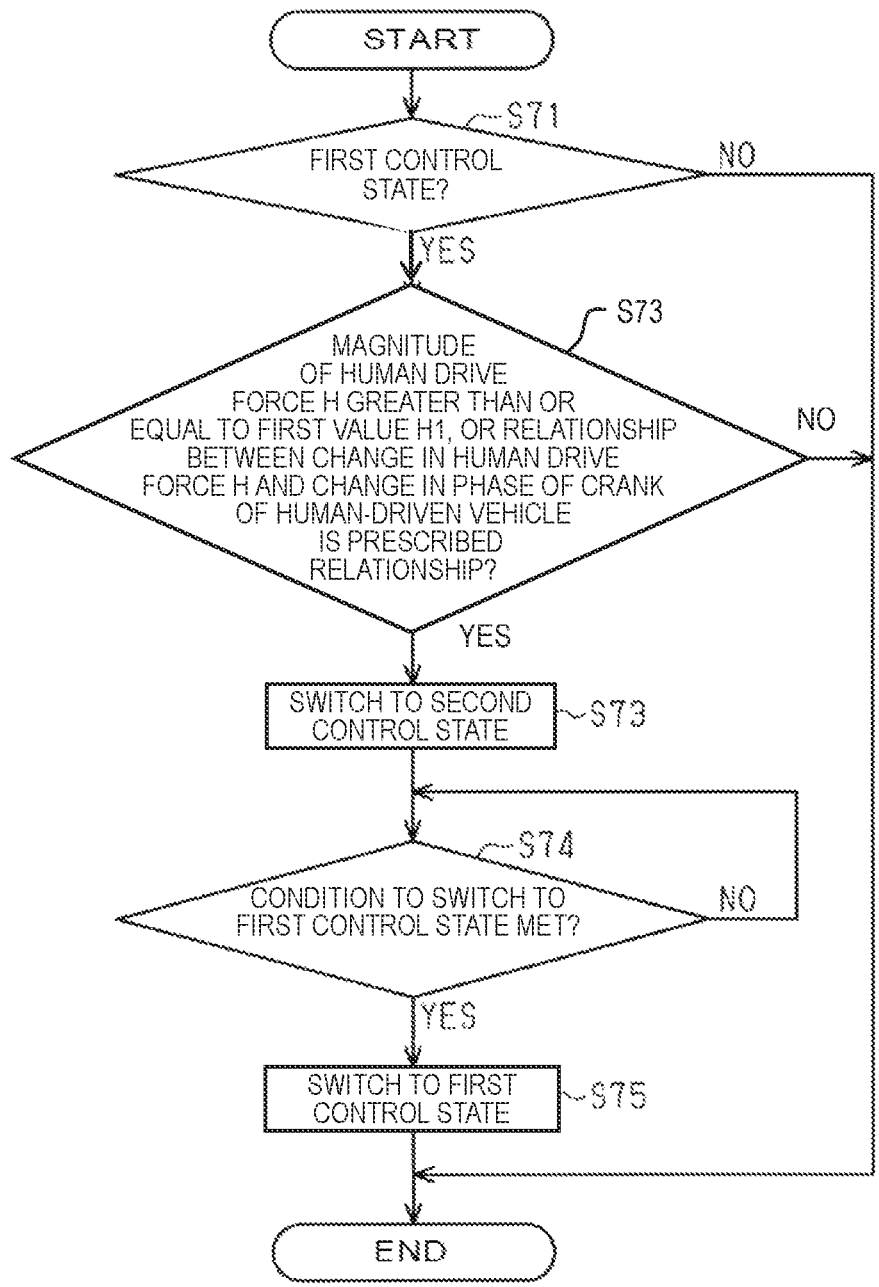
FIG. 10 is a flow chart of the control process for switching between the first control state and the second control state according to one example of a fifth example executed by the electronic controller of FIG. 2.

The process for switching between the first control state and the second control state according to one example of the fifth example will be described with reference to FIG. 10. If electric power is supplied to the controller 52 from the battery 44, the controller 52 initiates the process and proceeds to Step S71 of the flow chart shown in FIG. 10. The controller 52 executes the process from Step S71 each prescribed cycle as long as electric power is being supplied.

The controller 52 determines whether it is in the first control state in Step S71. If it is not in the first control state, then the controller 52 ends the process. If it is in the first control state, then the controller 52 proceeds to Step S72.

In Step S72, the controller 52 determines whether the magnitude of the human drive force H is greater than or equal to the first value H1 or the relationship between the change in the human drive force H and the change in the phase of the crank 14 of the human-powered vehicle 10 is the prescribed relationship. If the magnitude of the human drive force H is less than the first value H1 or the relationship between the change in the human drive force H and the change in the phase of the crank 14 of the human-powered vehicle 10 is not the prescribed relationship, then the controller 52 ends the process. If the magnitude of the human drive force H is greater than or equal to the first value H1 or the relationship between the change in the human drive force H and the change in the phase of the crank 14 of the human-powered vehicle 10 is the prescribed relationship, then the controller 52 proceeds to Step S73.

The controller 52 can be configured to proceed to Step S73 if the magnitude of the human drive force H is greater than or equal to the first value H1 in Step S72. The controller 52 can be configured to proceed to Step S73 if the relationship between the change in the human drive force H and the change in the phase of the crank 14 of the human-powered vehicle 10 is the prescribed relationship, in Step S72. The controller 52 can be configured to proceed to Step S73 if the magnitude of the human drive force H is greater than or equal to the first value H1 and the relationship between the change in the human drive force H and the change in the phase of the crank 14 of the human-powered vehicle 10 is the prescribed relationship, in Step S72.

In Step S73, the controller 52 switches to the second control state and proceeds to Step S74. In Step S74, the controller 52 determines whether the condition for switching to the first control state is met. In the case that the condition for switching to the first control state is the opposite of the condition for switching to the second control state, the condition for switching to the first control state is satisfied if the magnitude of the human drive force H is less than the first value H1, or the relationship between the change in the human drive force H and the change in the phase of the crank 14 of the human-powered vehicle 10 is not the prescribed relationship. The controller 52 repeats the determination process of Step S74 until the condition for switching to the first control state is met. If the condition for switching to the first control state is met, then the controller 52 proceeds to Step S75. In Step S75, the controller 52 switches to the first control state and ends the process.

The condition for switching to the first control state can be configured to be satisfied if a prescribed period of time has elapsed after switching to the second control state. In this case, the controller 52 can determine that the condition for switching to the first control state has been met in Step S74 if the prescribed period of time has elapsed after switching to the second control state in Step S73.

In the case that the fourth detection unit 64 detects at least one of the yaw angle DY and the roll angle DR, the fourth detection unit 64 includes the tilt sensor. One example of the tilt sensor is a gyro sensor or an acceleration sensor. The fourth detection unit 64 is configured similarly to the tilt sensor of the gradient sensor 56C. If the gradient sensor 56C includes the tilt sensor, the fourth detection unit 64 can be integrated with the gradient sensor 56C.

In another example of the fifth example, the first parameter includes the roll angle DR of the vehicle body 12. The controller 52, in the first control state, switches to the second control state if an amount of change DDR in the roll angle DR is greater than a prescribed amount of change DDRX.

In the case that the first parameter P1 includes the roll angle DR, the fourth detection unit 64 includes the tilt sensor. One example of the tilt sensor is a gyro sensor or an acceleration sensor. The fourth detection unit 64 is configured similarly to the tilt sensor of the gradient sensor 56C. If the gradient sensor 56C includes the tilt sensor, the fourth detection unit 64 can be integrated with the gradient sensor 56C.

For example, if the rider's posture is riding out of the saddle, the amount of change DDR of the roll angle DR becomes larger than if the rider's posture is sitting. The prescribed amount of change DDRX is set to a value that corresponds to the magnitude of the amount of change DDR of the roll angle DR if the rider's posture is riding out of the saddle.

Figure 11:
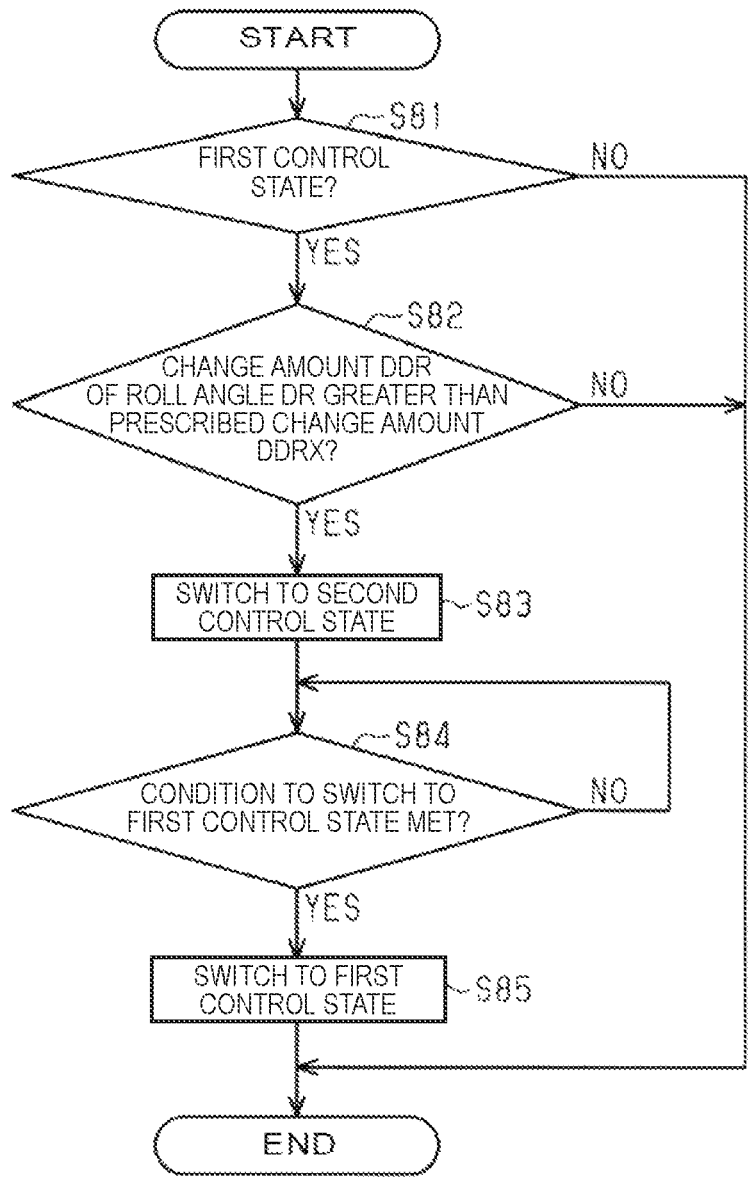
FIG. 11 is a flow chart of the control process for switching between the first control state and the second control state according to another example of the fifth example executed by the electronic controller of FIG. 2.

The process for switching between the first control state and the second control state according to another example of the fifth example will be described with reference to FIG. 11. If electric power is supplied to the controller 52 from the battery 44, then the controller 52 initiates the process and proceeds to Step S81 of the flow chart shown in FIG. 11. The controller 52 executes the process from Step S81 each prescribed cycle as long as electric power is being supplied.

The controller 52 determines whether it is in the first control state in Step S81. If it is not in the first control state, then the controller 52 ends the process. If it is in the first control state, then the controller 52 proceeds to Step S82.

In Step S82, the controller 52 determines whether the amount of change DDR of the roll angle DR is greater than the prescribed amount of change DDRX. If the amount of change DDR of the roll angle DR is not greater than the prescribed amount of change DDRX, the controller 52 ends the process. If the amount of change DDR of the roll angle DR is greater than the prescribed amount of change DDRX, then the controller 52 proceeds to Step S83.

In Step S83, the controller 52 switches to the second control state and proceeds to Step S84. In Step S84, the controller 52 determines whether the condition for switching to the first control state is met. In the case that the condition for switching to the first control state is the opposite of the condition for switching to the second control state, the condition for switching to the first control state is satisfied if the amount of change DDR of the roll angle DR is not greater than the prescribed amount of change DDRX. The controller 52 repeats the determination process of Step S84 until the condition for switching to the first control state is met. If the condition for switching to the first control state is met, then the controller 52 proceeds to Step S85. In Step S85, the controller 52 switches to the first control state and ends the process.

The condition for switching to the first control state can be configured to be satisfied if a prescribed period of time has elapsed after switching to the second control state. In this case, the controller 52 can determine that the condition for switching to the first control state has been met in Step S84 if the prescribed period of time has elapsed after switching to the second control state in Step S83.

In the sixth example, the controller 52 switches between the first control state and the second control state in accordance with an output of a fifth detection unit 66, which detects the steering angle SA of the handle of the human-powered vehicle 10 as information relating to the motion state. In this case, the control device 50 preferably further includes the fifth detection unit 66.

The fifth detection unit 66 detects the angle of at least one of the front fork 20, the handle 22A, the stem 22B, and the front wheel, with respect to the frame 18. In one example, the fifth detection unit 66 includes a rotation angle sensor. The fifth detection unit 66 is, for example, provided in a head tube of the frame 18 and detects the rotational angle of the front fork 20 with respect to the head tube. The rotational angle of the front fork 20 with respect to the head tube correlates with the steering angle SA.

In one example of the sixth example, the controller 52, if in the first control state, switches to the second control state if the steering angle S is greater than a first steering angle S1. For example, the steering angle S increases if the human-powered vehicle 10 is turning, is in a slalom, or is passing through a tight corner. The first steering angle S1 is set to an angle that corresponds to the steering angle S if the human-powered vehicle 10 is turning, is in a slalom, or is passing through a tight corner.

Figure 12:
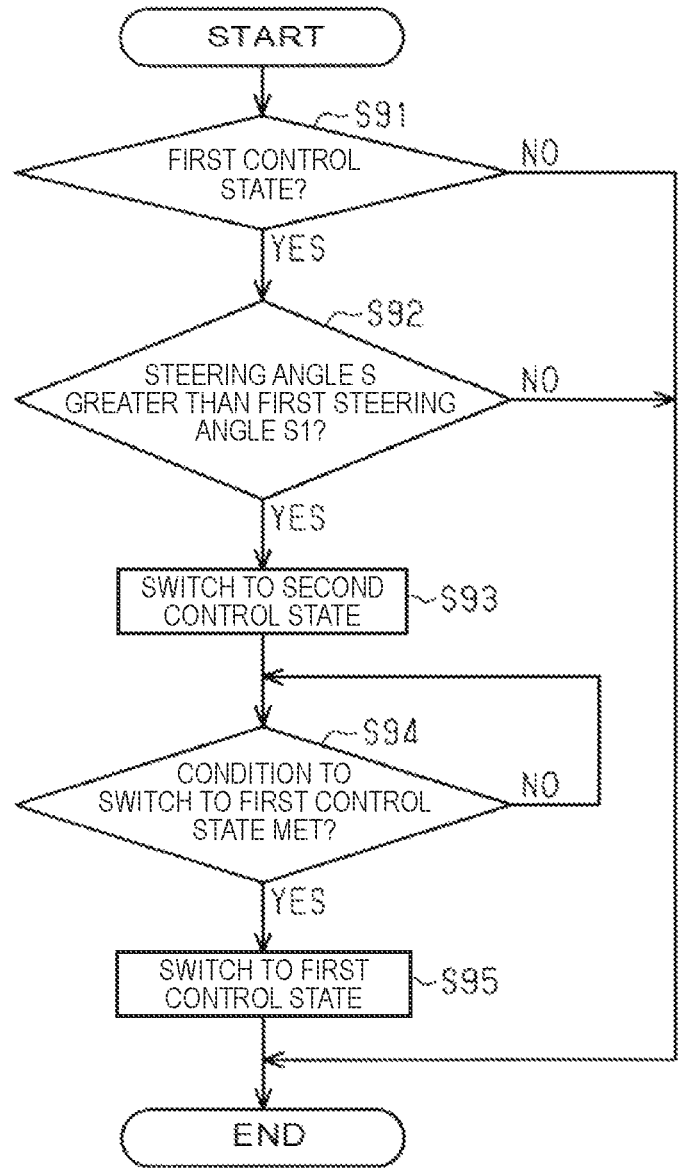
FIG. 12 is a flow chart of the control process for switching between the first control state and the second control state according to one example of a sixth example executed by the electronic controller of FIG. 2.

The process for switching between the first control state and the second control state according to one example of the sixth example will be described with reference to FIG. 12. If electric power is supplied to the controller 52 from the battery 44, the controller 52 initiates the process and proceeds to Step S91 of the flow chart shown in FIG. 12. The controller 52 executes the process from Step S91 each prescribed cycle as long as electric power is being supplied.

The controller 52 determines whether it is in the first control state in Step S91. If it is not in the first control state, then the controller 52 ends the process. If it is in the first control state, then the controller 52 proceeds to Step S92.

In Step S92, the controller 52 determines whether the steering angle S is greater than the first steering angle S1. If the steering angle S is not greater than the first steering angle S1, then the controller 52 ends the process. If the steering angle S is greater than the first steering angle S1, then the controller 52 proceeds to Step S93.

In Step S93, the controller 52 switches to the second control state and proceeds to Step S94. In Step S94, the controller 52 determines whether the condition for switching to the first control state is met. In the case that the condition for switching to the first control state is opposite to the condition for switching to the second control state, the condition for switching to the first control state is satisfied if the steering angle S is not greater than the first steering angle S1. The controller 52 repeats the determination process of Step S94 until the condition for switching to the first control state is met. If the condition for switching to the first control state is met, then the controller 52 proceeds to Step S95. In Step S95, the controller 52 switches to the first control state and ends the process.

The condition for switching to the first control state can be configured to be satisfied if a prescribed period of time has elapsed after switching to the second control state. In this case, the controller 52 can determine that the condition for switching to the first control state has been met in Step S94 if the prescribed period of time has elapsed after switching to the second control state in Step S193.

In another example of the sixth example, the controller 52, if in the first control state, switches to the second control state if the steering angle S repeatedly increases and decreases within a third period of time T3. For example, in the case that the human-powered vehicle 10 is wobbling or traveling in a location where there are many obstacles, such as in the city, the steering angle S frequently increases and decreases. The third period of time T3 is set to a period of time with which it is possible to determine a repeated increase and decrease of steering angle S in the case that the human-powered vehicle 10 is wobbling or traveling in a location where there are many obstacles, such as in the city. For example, the controller 52 determines that the steering angle S has repeatedly increased and decreased within the third period of time T3 if an increase of at least a third prescribed angle as well as a decrease of at least a fourth prescribed angle have respectively occurred a prescribed number of times or more in the steering angle S, within the third period of time T3.

Figure 13:
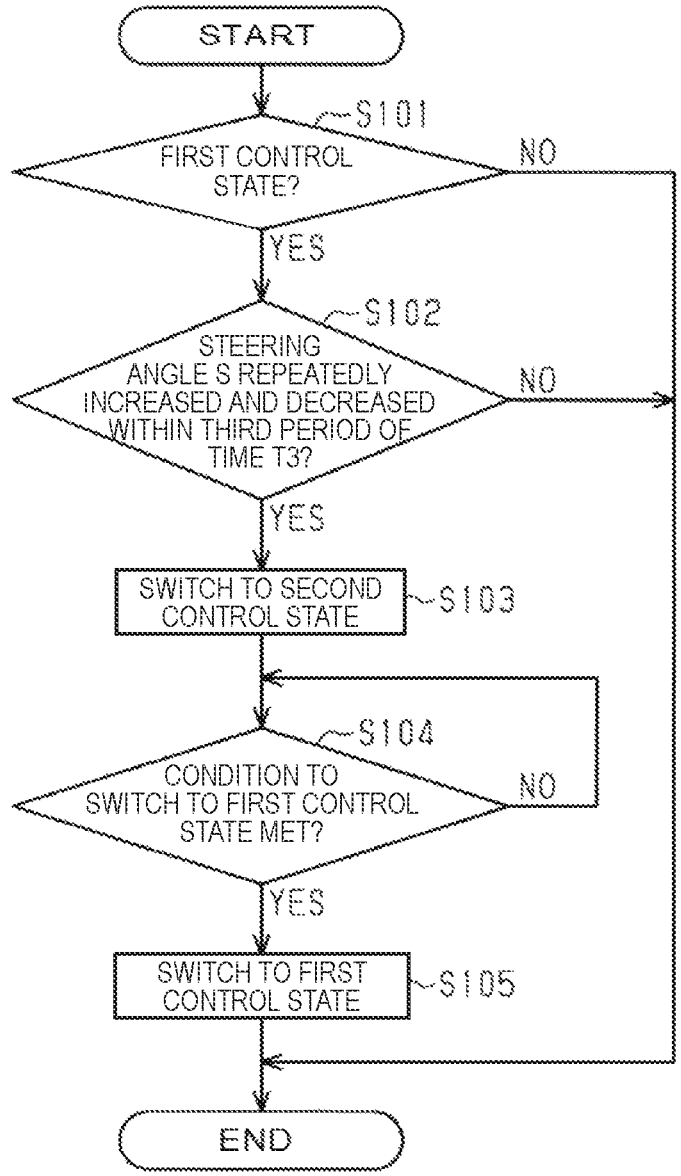
FIG. 13 is a flow chart of the control process for switching between the first control state and the second control state according to another example of the sixth example executed by the electronic controller of FIG. 2.

The process for switching between the first control state and the second control state according to another example of the sixth example will be described with reference to FIG. 13. If electric power is supplied to the controller 52 from the battery 44, then the controller 52 initiates the process and proceeds to Step S101 of the flow chart shown in FIG. 13. The controller 52 executes the process from Step S101 each prescribed cycle as long as electric power is being supplied.

The controller 52 determines whether it is in the first control state in Step S101. If it is not in the first control state, the controller 52 ends the process. If it is in the first control state, the controller 52 proceeds to Step S102.

In Step S102, the controller 52 determines whether the steering angle S has repeatedly increased and decreased within the third period of time T3. If the steering angle S has not repeatedly increased and decreased within the third period of time T3, then the controller 52 ends the process. If the steering angle S has repeatedly increased and decreased within the third period of time T3, then the controller 52 proceeds to Step S103.

In Step S103, the controller 52 switches to the second control state and proceeds to Step S104. In Step S104, the controller 52 determines whether the condition for switching to the first control state is met. In the case that the condition for switching to the first control state is opposite to the condition for switching to the second control state, the condition for switching to the first control state is satisfied if the steering angle S has not repeatedly increased and decreased within the third period of time T3. The controller 52 repeats the determination process of Step S104 until the condition for switching to the first control state is met. If the condition for switching to the first control state is met, then the controller 52 proceeds to Step S105. In Step S105, the controller 52 switches to the first control state and ends the process.

The condition for switching to the first control state can be configured to be satisfied if a prescribed period of time has elapsed after switching to the second control state. In this case, the controller 52 can determine that the condition for switching to the first control state has been met in Step S104, if the prescribed period of time has elapsed after switching to the second control state in Step S103.

In the seventh example, the controller 52 switches between the first control state and the second control state corresponding to the steering state in accordance with an output of a sixth detection unit 68, which detects the rider's gripping state of the handle of the human-powered vehicle 10. The controller 52, if in the first control state, switches to the second control state if at least one hand of the rider is not gripping the handle 22A. In this case, the control device 50 preferably further includes the sixth detection unit 68. The sixth detection unit 68 detects the rider's gripping state of the handle 22A. The sixth detection unit 68 includes, for example, at least one of a pressure sensor, a load sensor, and a contact sensor provided on the handle 22A. The sixth detection unit 68 is preferably configured to be capable of respectively detecting the gripping states of the handle 22A of both of the rider's hands.

Figure 14:
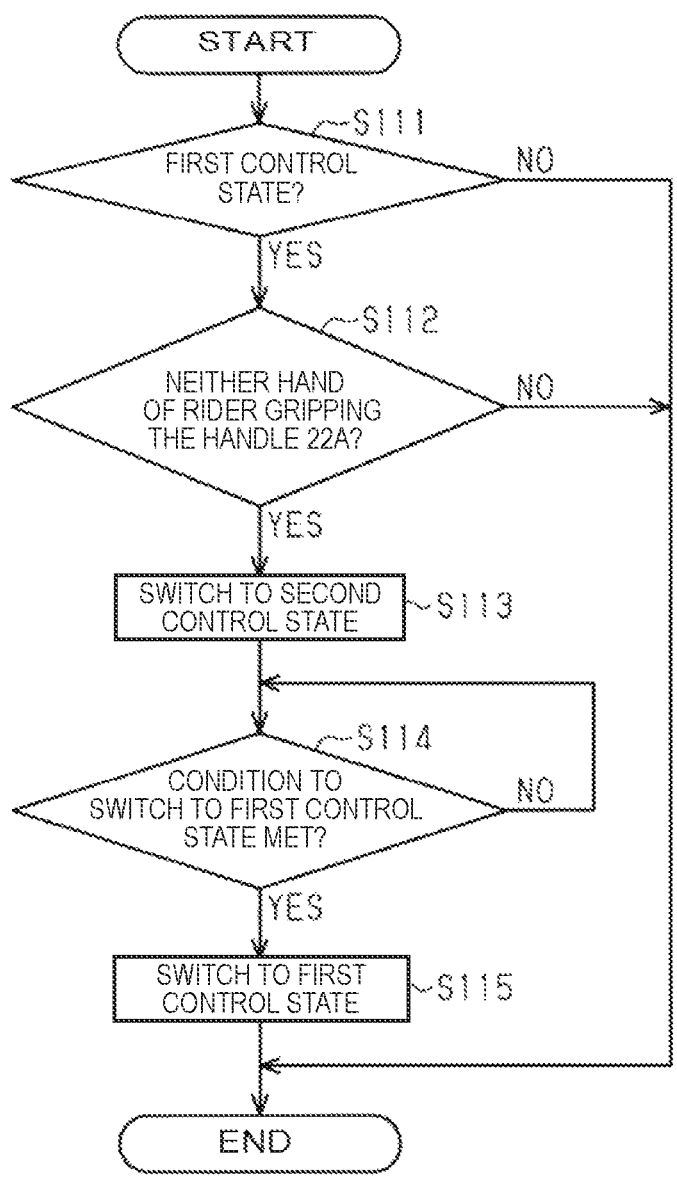
FIG. 14 is a flow chart of the control process for switching between the first control state and the second control state in a seventh example executed by the electronic controller of FIG. 2.

The process for switching between the first control state and the second control state according to the seventh example will be described with reference to FIG. 14. If electric power is supplied to the controller 52 from the battery 44, then the controller 52 initiates the process and proceeds to Step S111 of the flow chart shown in FIG. 14. The controller 52 executes the process from Step S111 each prescribed cycle as long as electric power is being supplied.

The controller 52 determines whether it is in the first control state in Step S111. If it is not in the first control state, then the controller 52 ends the process. If it is in the first control state, then the controller 52 proceeds to Step S112.

In Step S112, the controller 52 determines whether neither hand of the rider is gripping the handle 22A. If at least one hand of the rider is gripping the handle 22A, then the controller 52 ends the process. If neither hand of the rider is gripping the handle 22A, then the controller 52 proceeds to Step S113.

In Step S113, the controller 52 switches to the second control state and proceeds to Step S114. In Step S114, the controller 52 determines whether the condition for switching to the first control state is met. In the case that the condition for switching to the first control state is opposite to the condition for switching to the second control state, the condition for switching to the first control state is satisfied if the at least one hand of the rider is gripping the handle 22A. The controller 52 repeats the determination process of Step S114 until the condition for switching to the first control state is met. If the condition for switching to the first control state is met, then the controller 52 proceeds to Step S115. In Step S115, the controller 52 switches to the first control state and ends the process.

The condition for switching to the first control state can be configured to be satisfied if a prescribed period of time has elapsed after switching to the second control state. In this case, the controller 52 can determine that the condition for switching to the first control state has been met in Step S114 if the prescribed period of time has elapsed after switching to the second control state in Step S113.

In the eighth example, the controller 52 switches between the first control state and the second control state in accordance with an output of a seventh detection unit 70, which detects a friction coefficient of the surface of the travel path or a second parameter P2 correlated with the friction coefficient as information relating to the surface condition of the travel path. The controller 52, if in the first control state, switches to the second control state if the second parameter P2 is greater than or equal to a prescribed value P2X. In this case, the control device 50 preferably further includes the seventh detection unit 70. The seventh detection unit 70 includes, for example, a slip detection sensor. In one example, the slip detection sensor includes the torque sensor and the crank rotation sensor. In another example, the slip detection sensor includes the crank rotation sensor and the vehicle speed sensor.

The torque sensor included in the slip detection sensor is used for detecting the torque of the human drive force H. In this case, the torque sensor included in the slip detection sensor is configured similarly to the torque sensor 56B. The torque sensor included in the slip detection sensor can be integrated with the torque sensor 56B. The crank rotation sensor included in the slip detection sensor is configured similarly to the crank rotation sensor 56A. The crank rotation sensor included in the slip detection sensor can be integrated with the crank rotation sensor 56A.

The vehicle speed sensor included in the slip detection sensor is used for detecting the rotational speed of the wheel. The vehicle speed sensor outputs a signal corresponding to the rotational speed of the wheel. The controller 52 calculates the vehicle speed V of the human-powered vehicle 10 based on the rotational speed of the wheel. The vehicle speed sensor preferably includes a Hall element or a magnetic reed that constitutes a reed switch. The vehicle speed sensor is attached to a chain stay of the frame 18 and detects a magnet attached to the rear wheel.

In the case that the seventh detection unit 70 includes the torque sensor and the crank rotation sensor, the second parameter P2 includes the torque and the rotational speed N of the crank 14. Specifically, in the first control state, the controller 52 switches to the second control state if the reduction amount of the torque is a prescribed torque or more, and the rotational speed N of the crank 14 is greater than or equal to a prescribed speed NX. In this case, the prescribed value P2X includes the prescribed speed NX and the prescribed torque corresponding to a slip state of the wheel.

In the case that the seventh detection unit 70 includes the crank rotation sensor and the vehicle speed sensor, the second parameter P2 includes the difference between a value calculated by the crank rotation sensor and the vehicle speed V calculated by the vehicle speed sensor. Specifically, the controller 52, if in the first control state, switches to the second control state if the difference between the value obtained by multiplying the rotational speed N of the crank 14 by the transmission ratio R and the vehicle speed V calculated by the vehicle speed sensor is greater than or equal to the first prescribed speed VX. In this case, the prescribed value P2X includes the first prescribed speed VX. In the first control state, if the difference between the rotational speed N of the crank 14 and the value obtained by dividing the vehicle speed V calculated by the vehicle speed sensor by the transmission ratio R is greater than or equal to a second prescribed speed VY, the controller 52 can switch to the second control state. In this case, the prescribed value P2X includes the second prescribed speed VY.

Figure 15:
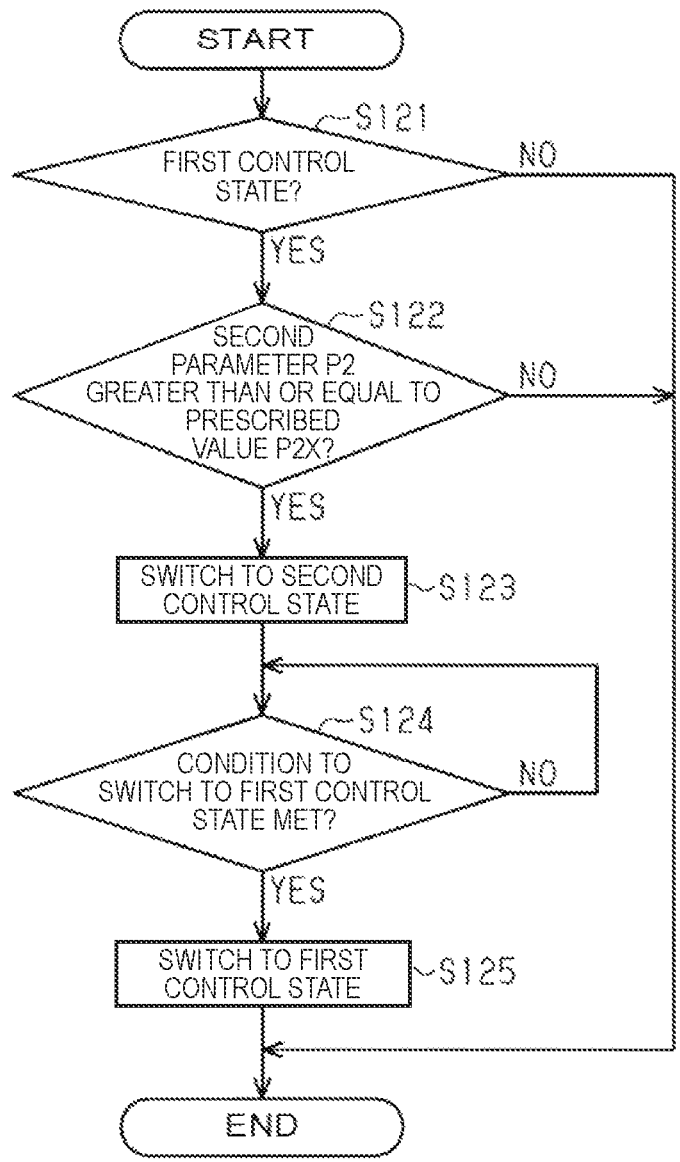
FIG. 15 is a flow chart of the control process for switching between the first control state and the second control state in an eighth example executed by the electronic controller of FIG. 2.

The process for switching between the first control state and the second control state according to the eighth example will be described with reference to FIG. 15. If electric power is supplied to the controller 52 from the battery 44, then the controller 52 initiates the process and proceeds to Step S121 of the flow chart shown in FIG. 15. The controller 52 executes the process from Step S121 each prescribed cycle as long as electric power is being supplied.

The controller 52 determines whether it is in the first control state in Step S121. If it is not in the first control state, the controller 52 ends the process. If it is in the first control state, then the controller 52 proceeds to Step S122.

In Step S122, the controller 52 determines whether the second parameter P2 is greater than or equal to the prescribed value P2X. If the second parameter P2 is not greater than or equal to the prescribed value P2X, then the controller 52 ends the process. If the second parameter P2 is greater than or equal to the prescribed value P2X, then the controller 52 proceeds to Step S123.

In Step S123, the controller 52 switches to the second control state and proceeds to Step S124. In Step S124, the controller 52 determines whether the condition for switching to the first control state is met. In the case that the condition for switching to the first control state is opposite to the condition for switching to the second control state, the condition for switching to the first control state is satisfied if the second parameter P2 is not greater than or equal to the prescribed value P2X. The controller 52 repeats the determination process of Step S124 until the condition for switching to the first control state is met. If the condition for switching to the first control state is met, then the controller 52 proceeds to Step S125. In Step S125, the controller 52 switches to the first control state and ends the process.

The condition for switching to the first control state can be configured to be satisfied if a prescribed period of time has elapsed after switching to the second control state. In this case, the controller 52 can determine that the condition for switching to the first control state has been met in Step S124 if the prescribed period of time has elapsed after switching to the second control state in Step S123.

In the ninth example, the controller 52 switches between the first control state and the second control state in accordance with an output of an eighth detection unit 72, which detects a connection between the rider's shoe and the shoe connection mechanism of the pedal 24 as the information relating to the pedaling preparation state. The controller 52, if in the first control state, switches to the second control state if at least one shoe of the rider is removed from the shoe connection mechanism. In this case, the control device 50 preferably further includes the eighth detection unit 72.

The shoe connection mechanism detachably connects the rider's shoe with the pedal 24. The pedal 24 is preferably a binding pedal. In one example, the eighth detection unit 72 is provided on at least one of the pedal 24 and the rider's shoe, and outputs a different signal depending on whether the rider's shoe and the pedal are connected in a normal state or are not connected in the normal state. For example, the eighth detection unit includes a contact sensor provided in a portion of the shoe connection mechanism that comes into contact with the shoe if the rider's shoe and the pedal are connected in the normal state.

Figure 16:
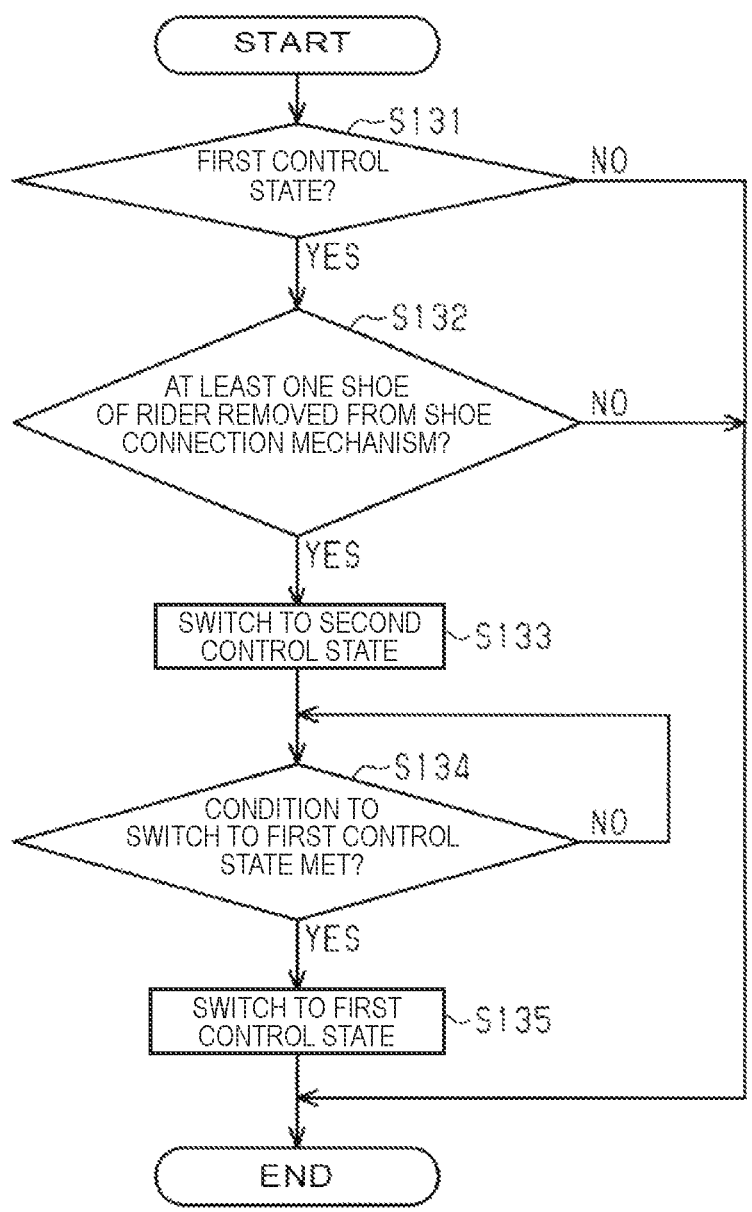
FIG. 16 is a flow chart of the control process for switching between the first control state and the second control state in a ninth example executed by the electronic controller of FIG. 2.

The process for switching between the first control state and the second control state according to the ninth example will be described with reference to FIG. 16. If electric power is supplied to the controller 52 from the battery 44, then the controller 52 initiates the process and proceeds to Step S131 of the flow chart shown in FIG. 16. The controller 52 executes the process from Step S131 each prescribed cycle as long as electric power is being supplied.

The controller 52 determines whether it is in the first control state in Step S131. If it is not in the first control state, then the controller 52 ends the process. If it is in the first control state, then the controller 52 proceeds to Step S132.

In Step S132, the controller 52 determines whether at least one shoe of the rider is removed from the shoe connection mechanism. If neither shoe of the rider is removed from the shoe connection mechanism, then the controller 52 ends the process. If at least one shoe of the rider is removed from the shoe connection mechanism, then the controller 52 proceeds to Step S133.

In Step S133, the controller 52 switches to the second control state and proceeds to Step S134. In Step S134, the controller 52 determines whether the condition for switching to the first control state is met. In the case that the condition for switching to the first control state is opposite to the condition for switching to the second control state, the condition for switching to the first control state is satisfied if the at least one shoe of the rider is not removed from the shoe connection mechanism. The controller 52 repeats the determination process of Step S134 until the condition for switching to the first control state is met. If the condition for switching to the first control state is met, then the controller 52 proceeds to Step S135. In Step S135, the controller 52 switches to the first control state and ends the process.

The condition for switching to the first control state can be configured to be satisfied if a prescribed period of time has elapsed after switching to the second control state. In this case, the controller 52 can determine that the condition for switching to the first control state has been met in Step S134 if the prescribed period of time has elapsed after switching to the second control state in Step S133.

The controller 52 can carry out one switching process between the first control state and the second control state illustrated in FIGS. 5 to 16, or can carry out two or more switching processes between the first control state and the second control state illustrated in FIGS. 5 to 16.

The controller 52 can be configured to be capable of switching between the first control state and the second control state according to a second prescribed set of conditions. The controller 52 is configured to be capable of selecting between either a first mode for switching from the first control state to the second control state if the second prescribed set of conditions is met and a second mode in which the first control state is maintained even if the second prescribed set of conditions is met, in accordance with an instruction from the rider. The rider instructs to select one of the first mode and the second mode to be selected using an operating unit. The operating unit can be provided in a cycle computer or provided in an external device such as a personal computer or a smartphone. The second prescribed set of conditions includes, for example, at least one of the conditions to switch to the second control state of the first to the ninth examples.

For example, in the ninth example, in the case that the rider is wearing a shoe that does not connect with the shoe connection mechanism and in the case that the pedal 24 does not include the shoe connection mechanism in the human-powered vehicle 10, the controller 52 maintains the second control state in the first mode, since the rider's shoe and the pedal are not connected in the normal state. In this case, the controller 52 can maintain the first control state if the rider selects the second mode.

Figure 17:
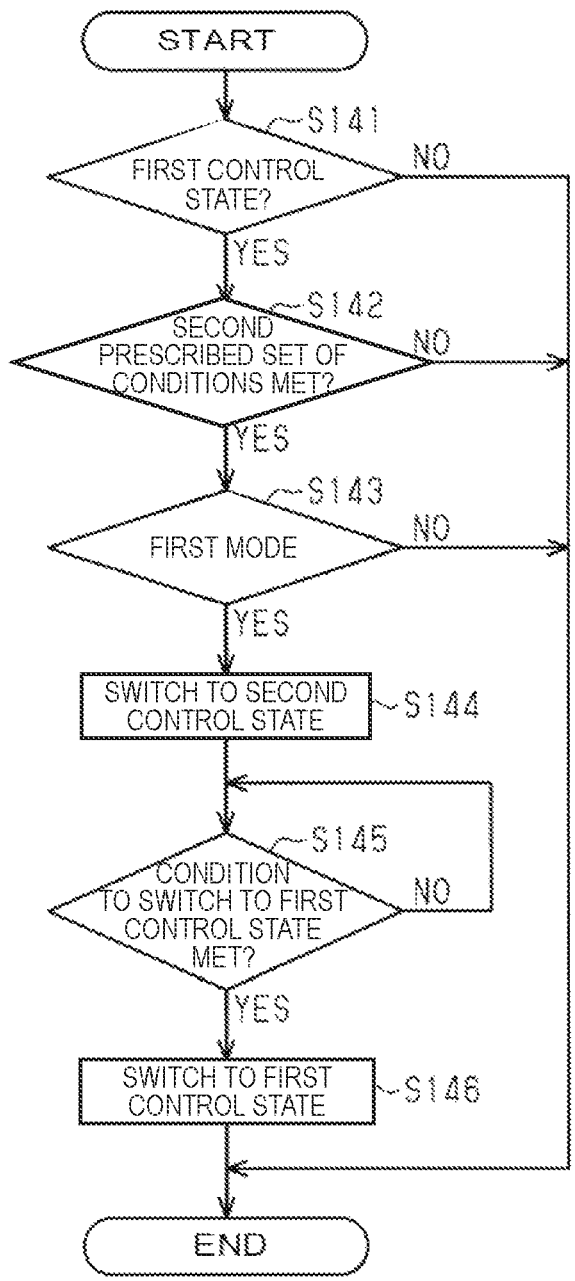
FIG. 17 is a flow chart of a control process for switching between the first control state and the second control state if it is possible to select between a first mode and a second mode executed by the electronic controller of FIG. 2.

The process for switching between the first control state and the second control state if it is possible to select between the first mode and the second mode will be described with reference to FIG. 17. If electric power is supplied to the controller 52 from the battery 44, then the controller 52 initiates the process and proceeds to Step S141 of the flow chart shown in FIG. 17. The controller 52 executes the process from Step S141 each prescribed cycle as long as electric power is being supplied.

The controller 52 determines whether it is in the first control state in Step S141. If it is not in the first control state, then the controller 52 ends the process. If it is in the first control state, then the controller 52 proceeds to Step S142.

In Step S142, the controller 52 determines whether the second prescribed set of conditions is met. If the second prescribed set of conditions is not met, then the controller 52 ends the process. If the second prescribed set of conditions is met, then the controller 52 proceeds to Step S143.

The controller 52 determines whether the mode is the first mode in Step S143. If the mode is not the first mode, then the controller 52 ends the process. If the mode is the first mode, then the controller 52 proceeds to Step S144.

In Step S144, the controller 52 switches to the second control state and proceeds to Step S145. In Step S145, the controller 52 determines whether the condition for switching to the first control state is met. In the case that the condition for switching to the first control state is the opposite of the condition for switching to the second control state, the condition for switching to the first control state is satisfied if the second prescribed set of conditions is no longer satisfied. The controller 52 repeats the determination process of Step S145 until the condition for switching to the first control state is met. If the condition for switching to the first control state is met, then the controller 52 proceeds to Step S146. In Step S146, the controller 52 switches to the first control state and ends the process.

If the mode is the second mode in Step S143, then the controller 52 ends the process. Thus, the first control state is not switched to the second control state, and the first control state is maintained.

The condition for switching to the first control state can be configured to be satisfied if a prescribed period of time has elapsed after switching to the second control state. In this case, the controller 52 can determine that the condition for switching to the first control state has been met in Step S144 if the prescribed period of time has elapsed after switching to the second control state in Step S143.

Modifications

The descriptions relating to the above-described embodiment are examples of forms that the human-powered vehicle control device according to the present invention can assume, and are not intended to limit the forms thereof. The human-powered vehicle control device according to the present invention can assume the forms of the modified examples of the above-described embodiment shown below, as well as forms that combine at least two modified examples that are not mutually contradictory. In the following modified examples, the portions common to the embodiment have been assigned the same reference symbols as the embodiment, and the descriptions thereof will be omitted. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

The controller 52 can be configured to be capable of changing the transmission ratio R if a gear shift request is generated by means of an operation of a shift operation device if in the first control state, and configured so as to not change the transmission ratio R if a gear shift request is generated by means of an operation of the shift operation device if in the second control state.

In addition to at least one of the first example and the second example, in the first control state, the controller 52 can be configured to switch to the second control state if the road gradient is a descending slope having a prescribed gradient or more.

The controller 52 can be configured to change the transmission ratio R according to a condition other than the travel state and the travel environment of the human-powered vehicle 10. For example, the controller 52 changes the transmission ratio R according to the state of the rider. The rider's state includes, for example, the heart rate.

What is claimed is:

1. A human-powered vehicle control device comprising:
   an electronic controller configured to control a transmission to initiate a shifting operation based on a set of prescribed conditions that changes a transmission ratio of a human-powered vehicle, the electronic controller being configured to switch between a first control state that controls the transmission to change the transmission ratio in accordance with a first prescribed set of conditions, and a second control state that controls the transmission to prevent the change of the transmission ratio as compared to the first control state, the electronic controller being configured to switch between the first control state and the second control state in accordance with a current detection of at least one of a rider's gripping state of a handle of the human-powered vehicle as information relating to a steering state of the human-powered vehicle, a friction coefficient of a surface of the travel path, and a connection between a rider's shoe and a shoe connection mechanism of the pedal as information relating to a pedaling preparation state.

2. The human-powered vehicle control device according to claim 1, wherein the electronic controller is configured to switch to the second control state in accordance with an output of the detection unit, which detects a rider's gripping state of a handle of the human-powered vehicle.

3. The human-powered vehicle control device according to claim 2, wherein the electronic controller is configured to switch to the second control state upon determining at least one hand of the rider is not gripping the handle while in the first control state.

4. The human-powered vehicle control device according to claim 1, wherein the electronic controller is configured to switch between the first control state and the second control state in accordance with an output of a detection unit which detects the friction coefficient of the surface of the travel path.

5. The human-powered vehicle control device according to claim 4, wherein the electronic controller is configured to switch to the second control state upon determining the friction coefficient of the surface of the travel path is a prescribed value or greater while in the first control state.

6. The human-powered vehicle control device according to claim 1, wherein the electronic controller is configured to switch between the first control state and the second control state in accordance with an output of a detection unit, which detects the connection between the rider's shoe and the shoe connection mechanism of the pedal as the information relating to the pedaling preparation state.

7. The human-powered vehicle control device according to claim 6, wherein the electronic controller is configured to switch to the second control state while in the first control state upon determining at least one shoe of the rider is removed from the shoe connection mechanism.

8. The human-powered vehicle control device according to claim 1, wherein the first prescribed set of conditions include at least one of a travel state and a travel environment of the human-powered vehicle.

9. The human-powered vehicle control device according to claim 1, wherein the electronic controller is configured to control the transmission to not change the transmission ratio in accordance with the first prescribed set of conditions while in the second control state.

10. The human-powered vehicle control device according to claim 9, wherein the electronic controller is configured to control the transmission to change the transmission ratio upon determining a parameter related to at least one of a travel state and a travel environment of the human-powered vehicle is outside of a first range while in the first control state, and the electronic controller is configured to control the transmission to change the transmission ratio upon determining the parameter is outside a second range, which is wider than the first range, while in the second control state.

* * * * *